United States Patent
Tsuzuki et al.

(10) Patent No.: US 10,781,307 B2
(45) Date of Patent: Sep. 22, 2020

(54) POLYOXYMETHYLENE RESIN MOLDED ARTICLE, SLIDING MEMBER, AND RAMP FOR HARD DISK

(71) Applicant: ASAHI KASEI KABUSHIKI KAISHA, Tokyo (JP)

(72) Inventors: Junichi Tsuzuki, Tokyo (JP); Yasukazu Shikano, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 70 days.

(21) Appl. No.: 16/036,225

(22) Filed: Jul. 16, 2018

(65) Prior Publication Data
US 2019/0062546 A1 Feb. 28, 2019

(30) Foreign Application Priority Data
Aug. 25, 2017 (JP) .................. 2017-162351

(51) Int. Cl.
| | |
|---|---|
| C08L 53/00 | (2006.01) |
| C08L 23/06 | (2006.01) |
| G11B 21/22 | (2006.01) |
| C08K 3/26 | (2006.01) |
| C08G 81/02 | (2006.01) |
| C08G 2/38 | (2006.01) |
| C08G 2/10 | (2006.01) |
| C08L 59/04 | (2006.01) |

(52) U.S. Cl.
CPC .............. C08L 53/005 (2013.01); C08G 2/10 (2013.01); C08G 2/38 (2013.01); C08G 81/025 (2013.01); C08K 3/26 (2013.01); C08L 23/06 (2013.01); C08L 59/04 (2013.01); G11B 21/22 (2013.01); C08L 2203/20 (2013.01)

(58) Field of Classification Search
CPC ........... C08L 59/04; C08L 59/02; C08L 23/06
See application file for complete search history.

(56) References Cited

U.S. PATENT DOCUMENTS

| | | | |
|---|---|---|---|
| 6,046,141 A | 4/2000 | Kurz et al. | |
| 2007/0129484 A1 | 6/2007 | Mitsuhiro et al. | |
| 2011/0237727 A1 | 9/2011 | Chang et al. | |
| 2012/0238680 A1 * | 9/2012 | Chang .................. | C08K 5/0016 524/222 |
| 2017/0283583 A1 | 10/2017 | Tsuzuki et al. | |

FOREIGN PATENT DOCUMENTS

| | | |
|---|---|---|
| CN | 106243609 A | 12/2016 |
| JP | H06-49320 A | 2/1994 |
| JP | 2000-7884 A | 1/2000 |
| JP | 2002063107 * | 3/2006 |
| JP | 2011-208114 A | 10/2011 |
| JP | 4906984 B2 | 3/2012 |
| JP | 2013082818 * | 8/2013 |
| JP | 2017-002227 A | 1/2017 |
| TW | 200530322 A | 9/2005 |
| WO | 2016/059711 A1 | 4/2016 |

OTHER PUBLICATIONS

Mitsuhiro et al., electronic translation of JP 2002063107, Mar. 2006.*
Ryoichi et al., electronic translation of JP 2013082818, Aug. 2013.*

* cited by examiner

*Primary Examiner* — Jeffrey C Mullis
(74) *Attorney, Agent, or Firm* — Greenblum & Bernstein, P.L.C.

(57) ABSTRACT

A polyoxymethylene resin molded article comprising 100 parts by mass of a polyoxymethylene resin (A) and 0.1 to 5 parts by mass of a sliding agent (B), wherein four or more dispersion domains of the sliding agent (B) are present in a region of 1000 nm in depth from a surface of the molded article and 12000 nm in width, and the dispersion domain has an average minor diameter of 300 nm or less, and an average major diameter of 600 nm or more and 5000 nm or less.

16 Claims, 1 Drawing Sheet

[Figure1]
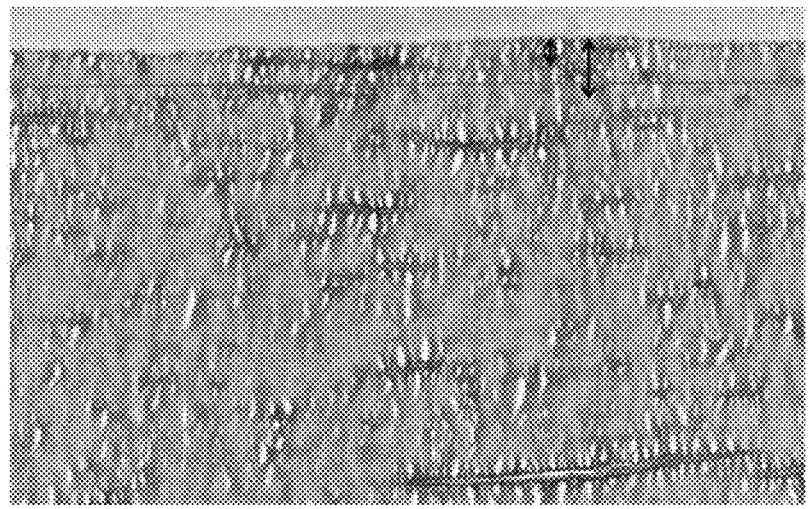
[Figure2]
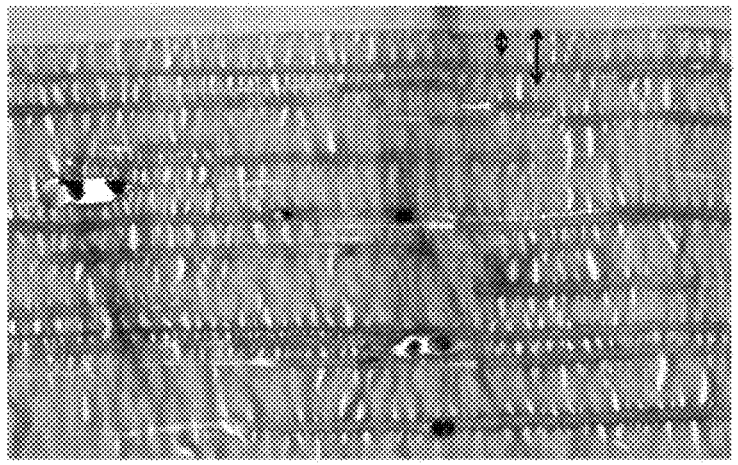

POLYOXYMETHYLENE RESIN MOLDED ARTICLE, SLIDING MEMBER, AND RAMP FOR HARD DISK

BACKGROUND OF THE INVENTION

Field of the Invention

The present invention relates to a polyoxymethylene resin molded article, a sliding member, and a ramp for a hard disk.

Description of the Related Art

Polyoxymethylene resin is excellent in the balance of mechanical strength, chemical resistance, sliding property, and wear resistance, and is easy to process. Accordingly, polyoxymethylene resin has been used in a wide range, as a typical engineering plastic, for mechanism parts in electrical equipment, automobile parts, and other mechanism parts.

When using polyoxymethylene resin for various applications as described above, the good sliding property of polyoxymethylene resin is emphasized. For example, in compact-disk drive gears or autosampler parts in measuring instruments, rubbing (friction) with other parts (of same or other materials) occurs under conditions of a relatively high load (e.g. generally a load of about 1 to 2 N). Therefore, high sliding property capable of preventing wear during rubbing is required.

To improve the wear resistance under a relatively high load, for example, Japanese Patent Laid-Open No. 6-49320 discloses a technique of adding a polyethylene wax of an ethylene/α-olefin copolymer or a modified product thereof as a sliding agent, and Japanese Patent No. 4,906,984 discloses a technique of adding an oxidized polyethylene wax as a sliding agent.

Further, Japanese Patent Laid-Open No. 2000-7884 discloses a technique using a modified polyolefin wax to suppress the shrinkage anisotropy, although this document does not mention sliding properties.

Japanese Patent Laid-Open No. 2011-208114 discloses that a polyoxymethylene resin composition containing a polyoxymethylene resin, an inorganic filler and a lubricant (a modified polyolefin, such as maleic anhydride-modified polyolefin) is used for a part called a ramp in a hard disk drive.

This part, ramp, is a part for saving a slider head, which is a reading or writing part, from a hard disk when reading or writing to the hard disk is in non-operating status. Specifically, when the slider head moves in and out of the ramp, a tab provided at the tip of the slider head is rubbed by an inclined portion of the ramp. The load during this rubbing is very low, and the load is about 0.05 N or less. The material having a high sliding property under a relatively high load as described above (a load of about 1 to 2 N) often fails to provide directly a material used under a very low load (a load of about 0.05 N or less). Similarly, a material used under a very low load (a load of about 0.05 N or less) often fails to provide a material having a high sliding property under such a high load (a load of about 1 to 2 N).

For example, a material having an excellent sliding property used for a part such as a gear driven under a high load as described above (a load of about 1 to 2 N) does not always provide a part having good performance when applied to a part such as a ramp part used under a very low load (a load of about 0.05 N or less). From this viewpoint, completely separately from conventional sliding agents used under a high load, a material for parts used under a very low load (a load of about 0.05 N or less) such as a hard disk ramp part are required.

To have wear resistance under a very low load, International Publication No. WO 2016-059711 discloses a technique of adding a low molecular weight sliding agent (such as ethylene glycol distearate and ethylene bis-stearic acid amide).

SUMMARY OF THE INVENTION

However, the techniques described in Japanese Patent Laid-Open No. 6-49320, Japanese Patent No. 4,906,984, and Japanese Patent Laid-Open No. 2000-7884 A, although they disclose effects on contraction anisotropy and improvement in wear resistance during sliding under high load, fail to consider wear resistance under a very low load (a load of about 0.05 N or less), and further improved wear resistance are desired in these techniques.

Further, it is also required to consider reducing odor during melt processing such as extrusion and molding; improving extrusion production stability against peeling, strand breakage or development of die drool caused by use of a large amount of conventional sliding agents (to suppress strand breakage or die drool attachment); improving surface smoothness and peeling property of surface layer of a molded piece from the viewpoint of influence on a friction coefficient during sliding; and reducing bleeding components and outgas components from the viewpoint of preventing malfunction of a hard disk.

The principal use of the recent hard disk has been changed from the use of installation for personal computers to the use of installation for high-volume servers responding to cloud computing, or for mobile-type hard disk drive (HDD) cassettes (iVDR), or the like.

Thus, new characteristics have been requested from the viewpoints of considering increase in the data storage volume and increase in the number of access to the hard disk, and ensuring high reliability of reading and writing of data, prevention of malfunction caused by vibration, impact, and/or high or low temperature environments, and the like.

In particular, a resin constituting a ramp part is requested to further improve wear resistance under various environments (e.g. high temperatures, low temperatures, normal temperature).

Further, hard disks have been used in various environments, thus it is known that slider head portions of hard disks suffer from adhesions of bleeding components and gas components generated after molding of the ramp, especially after assembly thereof. The weight change and deposit in the slider head portion cause reading/writing failures in the hard disk. Therefore, furthermore reduction of the bleeding and gas components has also been requested.

The techniques described in Japanese Patent Laid-Open No. 2011-208114 and International Publication No. WO 2016-059711 fail to respond to those requests.

Thus, an object of the present invention is to provide a polyoxymethylene resin molded article which can reduce wear loss during long-term sliding under a very low load, exhibit excellent sliding properties, and reduce outgas and bleeding components.

Means for Solving the Problem

The present inventors conducted intensive investigations to solve the above problems, and consequently have found that the problems can be solved by the polyoxymethylene resin molded article comprising a polyoxymethylene resin and a certain amount of sliding agent where the sliding agent are present in a specific dispersion form, and have completed the present invention.

That is, the present invention is as follows:

[1] A polyoxymethylene resin molded article comprising 100 parts by mass of a polyoxymethylene resin (A) and 0.1 to 5 parts by mass of a sliding agent (B), wherein four or more dispersion domains of the sliding agent (B) are present in a region of 1000 nm in depth from a surface of the molded article and 12000 nm in width, and the dispersion domain has an average minor diameter of 300 nm or less, and an average major diameter of 600 nm or more and 5000 nm or less.

[2] The polyoxymethylene resin molded article according to item [1], wherein a weight average molecular weight of the sliding agent (B) is 700 or more.

[3] The polyoxymethylene resin molded article according to item [1] or [2], wherein in a surface of the molded article, a peak intensity ratio (P/Q) of peak intensity P derived from C—O stretching vibration to peak intensity Q derived from C=O stretching vibration, as measured by infrared spectroscopy, is 200 to 5000.

[4] The polyoxymethylene resin molded article according to any one of items [1] to [3], wherein the sliding agent (B) is at least one selected from the group consisting of alcohols, amines, carboxylic acids, esters, amides, and olefin compounds.

[5] The polyoxymethylene resin molded article according to any one of items [1] to [4], wherein the sliding agent (B) comprises an olefin compound.

[6] The polyoxymethylene resin molded article according to item [5], wherein the olefin compound is at least one selected from the group consisting of polyethylene, polypropylene, ethylene-propylene copolymer, ethylene-butene copolymer, and ethylene-octene copolymer.

[7] The polyoxymethylene resin molded article according to item [6], wherein the olefin compound is at least one selected from the group consisting of polyethylene, polypropylene and modified compounds thereof.

[8] The polyoxymethylene resin molded article according to any one of items [1] to [7], wherein the sliding agent (B) comprises acid modified polyolefin having an acid value of 1 mg KOH/g or more.

[9] The polyoxymethylene resin molded article according to any one of items [1] to [8], wherein the sliding agent (B) comprises acid modified polyolefin having any of properties (1) to (4):
(1) an acid value of 38 to 80 mg KOH/g,
(2) an acid value of 2 to 25 mg KOH/g and a melt viscosity at 140° C. of 2900 mPa·s or less,
(3) an acid value of 1 to 75 mg KOH/g and a weight average molecular weight of 100 to 2500,
(4) an acid value of 1 to 75 mg KOH/g and a melt viscosity at 180° C. of 100 to 2500 mPa·s or less.

[10] The polyoxymethylene resin molded article according to any one of items [1] to [9], wherein the polyoxymethylene resin (A) comprises a block copolymer.

[11] The polyoxymethylene resin molded article according to item [10], wherein a difference between SP values of a block portion of the block copolymer comprised in the polyoxymethylene resin (A) and of the sliding agent (B) is 5 or less.

[12] The polyoxymethylene resin molded article according to item [10] or [11], wherein the block copolymer comprised in the polyoxymethylene resin (A) is an ABA-type block copolymer.

[13] The polyoxymethylene resin molded article according to any one of items [10] to [12], wherein the polyoxymethylene resin (A) comprises 5% by mass or more of the block copolymer based on a total of polyoxymethylene resin.

[14] The polyoxymethylene resin molded article according to items [10] to [12], wherein the polyoxymethylene resin (A) comprises 20% by mass or more of the block copolymer based on a total of polyoxymethylene resin.

[15] The polyoxymethylene resin molded article according to items [1] to [14], further comprising 0.01 to 3 parts by mass of a coloring agent (C) based on 100 parts by mass of the polyoxymethylene resin.

[16] The polyoxymethylene resin molded article according to items [1] to [15], wherein a relative element concentration ratio of carbon to oxygen [C/O] (atomic %) in a surface of the molded article is 1.01 to 2.50.

[17] A sliding member comprising the polyoxymethylene resin molded article according to items [1] to [16].

[18] A ramp for a hard disk comprising the polyoxymethylene resin molded article according to items [1] to [16].

According to the present invention, there is provided a polyoxymethylene resin molded article which reduces wear loss during prolonged sliding under a very low load, exhibits excellent sliding property, and is capable of reducing outgas and bleeding components.

BRIEF DESCRIPTION OF THE DRAWINGS

FIG. 1 shows a TEM image of Example 2; and
FIG. 2 shows a TEM image of Comparative Example 4.

DETAILED DESCRIPTION OF THE PREFERRED EMBODIMENTS

Hereinafter, embodiments of the present invention (hereinafter referred to as "the present embodiment") will be described in detail, but the present invention is not limited to the following description and it can be variously modified within the scope of the invention.

<<Resin Molded Article>>

The resin molded article of the present embodiment (hereinafter, sometimes referred to as "polyoxymethylene resin molded article" or simply "molded article") includes, for example, the polyoxymethylene resin composition of the present embodiment.

A polyoxymethylene resin molded article of the present embodiment comprises 100 parts by mass of a polyoxymethylene resin (A) and 0.1 to 5 parts by mass of a sliding agent (B), wherein four or more dispersion domains of the sliding agent (B) are present in a region of 1000 nm in depth from a surface of the molded article and 12000 nm in width, and the dispersion domain has an average minor diameter of 300 nm or less, and an average major diameter of 600 nm or more and 5000 nm or less. By taking this constitution, the polyoxymethylene resin molded article of the present embodiment can reduce wear loss during prolonged sliding under a very low load, exhibit excellent sliding property, and reduce outgas and bleeding components.

There is no particular limitation on the method for obtaining a resin molded article of the present embodiment, and any known molding methods can be applied to obtain the resin molded article. For example, molding method such as extrusion molding, injection molding, vacuum molding, blow molding, injection compression molding, decorative molding, other material molding, gas assist injection molding, foam injection molding, low pressure molding, ultra-thin injection molding (ultra-speed injection molding), in-mold composite molding (insert molding and outsert molding) and other molding methods can be used.

Concrete forms of the resin molded article of present embodiment are not particularly limited, and examples thereof include gears, cams, rollers, hard disk internal parts (a ramp, a latch member), sheets (for example, a extruded sheet) and the like.

The resin molded article of the present embodiment has an excellent sliding property, since it has a reduced wear loss under a very low load (for example, a load of 0.05 N or less). In this specification, a load of 0.05 N or less is referred to as "a very low load", and wear under a load of 0.05 N or less is referred to as "wear under a very low load".

As described above, an excellent sliding property under a high load (for example, a load of about 1 to 2 N) is difficult to coexist with an excellent sliding property under a very low load. This is considered to be based on the difference of load brought by sliding and the difference of sliding speed. Regarding sliding under a very low load, the sliding is often performed at a relatively high sliding speed, and the wear damage of a molded article composed of polyoxymethylene resin composition only occur at the surface layer of the molded article (for example, until about a depth of several μm from the surface). This is completely different from the aspect relating to sliding under conventional high load.

The polyoxymethylene resin molded article of the present embodiment, unlike conventionally known resin molded articles, by having the above-described constitution, specifically by having the special surface layer detailed later, exhibits a specific effect of improvement on the wear in the very surface layer, even under a very low load. More specifically, the polyoxymethylene resin molded article of the present embodiment has an effect of suppressing the wear damage which occurs only to the very surface layer, and can maintain sufficient wear resistance after more than 1,000,000 times of rubbing.

<<Molded Article Surface Layer>>

The term "special surface layer" in the present embodiment is a layer in which four or more dispersion domains of the sliding agent (B) are present in a region of 1000 nm in depth from a surface of the molded article and 12000 nm in width, and the dispersion domain has an average minor diameter of 300 nm or less, and an average major diameter of 600 nm or more and 5000 nm or less.

This special surface layer cannot be achieved just by melt-kneading a sliding agent into a general polyoxymethylene resin. In more detail, for example, when blending and melt-kneading a sliding agent (e.g., ester-based compounds or amide compounds having low molecular weight) with a polyoxymethylene resin, the ester-based compounds or amide compounds having low molecular weight cannot be uniformly dispersed in the resin during extrusion, resulting in extrusion failure. Further, ester-based compounds or amide-based compounds tend to bleed out in a large amount on the surface layer of the molded article. The wear resistance of the obtained molded article under a very low load is good at an early stage because the bleed out sliding agents are present on the surface layer, however, after such bleed out compounds have been removed by sliding, the wear resistance tends to be drastically deteriorated.

Further, depending on the use environment of molded article, the molded article is often subjected, after a certain period of time from the molding, to the removal of hydrocarbons deposited from the air and bleed out sliding agents from the inside of the molded article, before use. More specifically, a molded article used for an internal mechanical part of precision drive device such as a semiconductor is first subjected to cleaning of resin parts and metal parts using a cleaning agent, then assembled. In this case, the sliding agent which were bled out and present on the surface of the molded article has been removed, so that the wear resistance of the resultant molded article tends to be further deteriorated.

Further, even when the sliding agent is not ester-based compound or amide compound having low molecular weight, but a high-molecular-weight sliding agent (polymer sliding agent) such as polyolefin alone, the special surface layer cannot be achieved either. This is considered because the polymer sliding agent cannot be stably dispersed in the polyoxymethylene resin, and the sliding agent cannot be present in the outermost layer during the molding. When a friction wear test is conducted in this case, wear progresses until a region where the sliding agent exists, and the wear is suppressed in the region where the sliding agent exists. Since the wear loss of this case occurs in several μm to 10 μm from the surface layer, it is believed that high molecular weight sliding agent is present only until a depth from several μm to 10 μm from the surface layer. In this case, the wear under a very low load becomes deteriorated from the early stage of sliding, and thus it fails to respond to the new request of wear resistance to more than 1,000,000 times of sliding.

The method for measuring the special surface layer of the present embodiment will be exemplified below. The polyoxymethylene resin molded article of the present embodiment has a sea-island structure composed of a sea phase having the polyoxymethylene resin (A) as a main component and an island phase having the sliding agent (B) as a main component. The sea-island structure can be observed by electron microscopes (transmission electron microscope (TEM) or scanning electron microscope (SEM)) or optical microscopes. These analysis devices are generally used, and for example, a transmission electron microscope H-7650 manufactured by Hitachi, Ltd. can be used. The identification of the polyoxymethylene resin (A) and the sliding agent (B) can be easily performed by one skilled in the art. More specifically, the resin and the sliding agent can be identified by, when using a transmission electron microscope, the color shade of the screen due to the difference in permeability of the electron beam resulting from the molecular structure, by the difference brought by dyes such as osmic acid and ruthenium tetroxide, and by the difference of lamellar structures due to the crystalline polymer.

In the polyoxymethylene resin molded article of the present embodiment, when the surface parallel to the resin flow direction near the surface of the molded article is observed with a transmission electron microscope or the like, four or more dispersion domains of the sliding agent (B) are present in a region of 1000 nm in depth from a surface of the molded article and 12000 nm in width, and the dispersion domain has an average minor diameter of 300 nm or less, and an average major diameter of 600 nm or more and 5000 nm or less.

The number of dispersion domains (island phase) of the sliding agent (B) present in a region of 1000 nm in depth from the surface and 12000 nm in width is four or more, preferably five or more, and more preferably six or more. The upper limit of the number of dispersion domains of the sliding agent (B) is not particularly limited, but preferably 100 from the viewpoint of peeling of the layer. By setting the number of the dispersion domain of the sliding agent (B) to the range described above, the resin molded article of the present embodiment can maintain enough wear resistance after more than 1,000,000 times of sliding. To achieve the number of dispersion domains of 4 or more, for example, a method comprising melt-kneading an appropriate sliding agent (for example, a sliding agent having an appropriate modification, viscosity, molecular weight, and the like) into the polyoxymethylene resin to be used, can be used.

The average minor diameter of the dispersion domain is set to 300 nm or less from the viewpoint of sliding property under a very low load. From the similar viewpoint, the lower limit of the average minor diameter of the dispersion domain is preferably 50 nm, more preferably 100 nm and further preferably 150 nm, and the upper limit of the average minor diameter of the dispersion domain is more preferably 250 nm and further preferably 200 nm. The average major diameter of the dispersion domain is, from the viewpoint of bleed out resistance, set to 600 nm or more and 5000 nm or less. The lower limit of the average major diameter of the dispersion domain is preferably 600 nm, more preferably 800 nm, further preferably 1000 nm and especially 1500 nm, and the upper limit of the average major diameter of the dispersion domain is preferably 3000 nm, and more preferably 2500 nm.

To control the average minor diameter and the average major diameter of the dispersion domain, for example, a method comprising melt-kneading an appropriate sliding agent (for example, a sliding agent having an appropriate modification, viscosity, molecular weight, and the like) into the polyoxymethylene resin to be used, can be used.

Further, in the polyoxymethylene resin molded article of the present embodiment, when the surface parallel to the resin flow direction near the surface of the molded article is observed with a transmission electron microscope or the like, the number of dispersion domains (island phase) of the sliding agent (B) present in a region of 500 nm in depth from a surface of the molded article and 12000 nm in width is preferably two or more, more preferably three or more, further preferably four or more, and especially five or more. The upper limit of the number of dispersion domains of the sliding agent (B) is not particularly limited, but preferably 100 from the viewpoint of peeling of the layer. By setting the number of the dispersion domain of the sliding agent (B) to the above range, the resin molded article of the present embodiment can maintain further enough wear resistance after more than 1,000,000 times of sliding.

In the following, a method for calculating an average minor diameter and average major diameter of the dispersion domain of the sliding agent (B) will be exemplified. That is, the average minor diameter and average major diameter can be calculated by observing the surface parallel to the resin flow direction near the surface of the molded article by a transmission electron microscope or the like, and measuring minor diameters and major diameters of each of the dispersion domains of the sliding agent (B), and then taking the arithmetic means of those measured minor and major diameters. The definition of the terms "major diameter" and "minor diameter" in the present embodiment are detailed as follows. First, the dispersion domain can be regarded as an ellipse. The ellipse is a curve made from a set of points such that the sum of the distances from two fixed points on a two-dimensional plane to every point on the curve is constant. The two fixed points serving as a reference is called focal points. As the distance of two focal points are smaller, the ellipse gets close to a circle, and when the two focal points coincide, the ellipse is a circle having the point as the center, thus a circle is a special type of an ellipse. When drawing a straight line through the two focal points inside the ellipse, the line is defined as the major axis, and the length of the major axis is defined as the major diameter. Further, when drawing a perpendicular bisector of the major axis inside the ellipse, this bisector is defined as the minor axis, and the length of the minor axis is defined as the minor diameter. Based on the definition, the major diameter and the minor diameter of the surface layer of the dispersion domain can be measured.

Alternatively, the specific surface layer may be a surface layer, where a relative element concentration ratio of carbon to oxygen [C/O] (atomic %) in the surface of the molded article (hereafter sometimes abbreviated as "c/o ratio") is 1.01 to 2.50. The relative element concentration ratio [C/O] can be measured according to the method detailed below. In general, when a polyoxymethylene resin alone, the C/O ratio is 1.00 due to the constituent element ratio of the polyoxymethylene resin, while when various sliding agents are added, the C/O ratio of the surface layer is varied. Conventionally used sliding agents are often relatively low molecular weight compounds such as ester-based compounds and amide-based compounds, and polymeric sliding agents such as polyolefin. Only by mixing such a sliding agent into the polyoxymethylene resin according to an ordinary method, the C/O ratio cannot be regulated to the range of 1.01 to 2.50. More specifically, when relatively low molecular weight compounds such as ester-based compounds and amide compounds are mixed into a polyoxymethylene resin according to ordinary methods, a large amount of ester-based compound or amide-based compound bleeds out on the surface layer of the molded article, and the C/O ratio of the surface layer tends to largely exceed 2.5. In this case, the wear resistance of the obtained molded article under a very low load is good at an early stage because the bleed out sliding agents are present in the surface layer, however, after such bleed out compounds have been removed by sliding, the wear resistance tends to be drastically deteriorated.

In contrast, when, not a low molecular weight ester-based compound or amide compound, but a high molecular weight sliding agent, such as polyolefin, is used alone, the C/O ratio of the surface layer thereof becomes the same as that of the polyoxymethylene resin, 1.00, and not become 1.01 or more. This is considered because, without limiting the present invention, such a high molecular weight sliding agent is present only at a depth from several μm to 10 μm from the surface layer, and thus the high molecular weight sliding agent is not exposed to the surface layer. In this case, the wear under a very low load becomes deteriorated from the early stage of sliding, and thus, it cannot respond to the new request of wear resistance to more than 1,000,000 times of sliding.

Next, a method of measuring the C/O ratio will be exemplified. The C/O ratio of the surface of the molded article can be easily obtained by measuring the surface of the molded article of the resin composition using a high-performance X-ray photoelectron spectrometer (which is generally referred to as "XPS"). An example of the analysis equipment is ESCALAB250 manufactured by Fisher Scientific K.K. As an excitation source upon the measurement, monoAlKα or the like is preferably used. Furthermore, in order to eliminate the influence of contaminants attached to the surface of the molded article, the surface of the molded article is subjected to ultrasonic cleaning using a cleaning agent (e.g., an aqueous solution of VALTRON DP97031), then washed with pure water, and then dried in an oven or the like. The C concentration in the XPS measurement is defined as a peak area in the range of peak tops 284 to 288 eV, and the 0 concentration is defined as a peak area in the range of peak tops 530 to 536 eV, and a relative element concentration can be calculated from the ratio of individual peak areas.

The C/O ratio of the surface of the molded article of the polyoxymethylene resin composition of the present embodiment is an indicator for the bleed out amount of the sliding agent (B) constituting the molded article of the polyoxymethylene resin composition as described later. The upper limit of the C/O ratio is preferably 2.50, and the lower limit thereof is preferably 1.01. More specifically, when a large amount of the sliding agent (B) bleeds out on the surface of the resin molded article (e.g., ramp molded article), the bleed out substances adhere to, accumulate on, or fall off from a tab which slides on the surface. It is undesirable because it causes reading failures in the hard disk. By setting the C/O ratio in the surface of the resin molded article to 2.50 or less, there is a tendency that the amount of bleed out substances can be further suppressed. From the similar viewpoint, the upper limit of C/O ratio is more preferably 2.30, further preferably 2.00, especially 1.90 (preferably 1.80). On the other hand, the lower limit of the C/O ratio in the surface of the resin molded article is preferably set so that the amount of bleed out substances is extremely small and the sliding agent is dispersed appropriately even in the vicinity of the surface layer. In other words, it is preferable that the surface layer is in a state very close to the really surface layer of polyoxymethylene, that is the state of C/O ratio is 1.01. The lower limit of C/O ratio is more preferably 1.03, further preferably 1.05, even more preferably 1.08, still more preferably 1.10.

Next, each component of the polyoxymethylene resin composition in the present embodiment will be described in detail.

<<(A) Polyoxymethylene Resin>>

The polyoxymethylene resin (A) comprised in the polyoxymethylene resin molded article of the present embodiment (hereinafter sometimes referred to as "component (A)" or "(A)") will be described in detail.

The polyoxymethylene resin (A) which can be used in the present embodiment may be polyoxymethylene homopolymer or polyoxymethylene copolymer. More specific examples include a polyoxymethylene homopolymer obtained by homopolymerizing a formaldehyde monomer or a cyclic oligomer of formaldehyde such as a trimer thereof (trioxane) or a tetramer thereof (tetraoxane), that is a polymer constituted substantially only by formaldehyde, and a polyoxymethylene copolymer obtained by copolymerizing formaldehyde monomer or a cyclic oligomer of formaldehyde such as a trimer thereof (trioxane) or a tetramer thereof (tetraoxane), with cyclic ethers or cyclic formals, such as ethylene oxide, propylene oxide, epichlorohydrin, 1,3-dioxolane, and cyclic formals of a glycol or a di-glycol such as 1,4-butanediol formal. Further, examples of the polyoxymethylene copolymer include a polyoxymethylene copolymer having a branch, obtained by copolymerizing formaldehyde monomer and/or a cyclic oligomer of formaldehyde with a monofunctional glycidyl ether, and a polyoxymethylene copolymer having a crosslinked structure, obtained by copolymerizing formaldehyde monomer and/or a cyclic oligomer of formaldehyde with a multifunctional glycidyl ether.

Further, polyoxymethylene resin (A) may comprise a block copolymer having a heterologous block which is a block of different kind from the repeating structural unit of polyoxymethylene. The rigidity of the resin molded article tends to be more excellent by comprising a block copolymer in the polyoxymethylene resin (A). Further, in the heterologous block portion of the polymer, a sliding agent (B) (in particular, acid-modified polyolefin or the like) may be selectively and stably present. As a result, the resin molded article can maintain further enough wear resistance after more than 1,000,000 times of sliding.

The block copolymer is preferably an acetal homopolymer or acetal copolymer (hereinafter, both are also referred to as "block copolymer") which comprises at least one block portion selected from the group consisting of general formulae (1), (2), (3), (4), (5), (6), and (7).

(1)

(2)

(3)

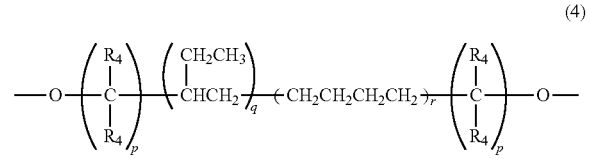

(4)

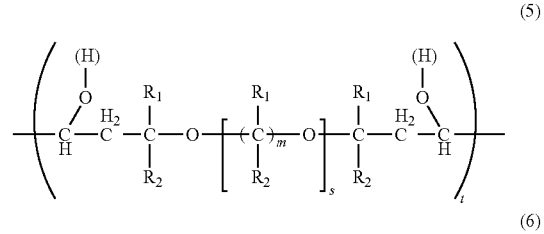

(5)

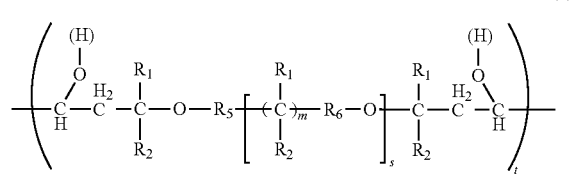

(6)

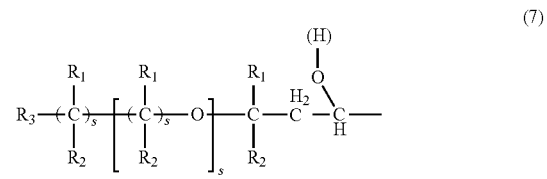

(7)

In the general formulae (1), (2), (3), (5), (6) and (7), $R_1$ and $R_2$ each independently represent at least one chemical species selected from the group consisting of a hydrogen atom, an alkyl group, a substituted alkyl group, an aryl group and a substituted aryl group. When there are a plurality of $R_1$ and $R_2$, they may be the same or different from each other.

In the general formulae (1), (2), (6) and (7), $R_3$, $R_5$, and $R_6$ each independently represent at least one chemical species selected from the group consisting of an alkyl group, a substituted alkyl group, an aryl group and a substituted aryl group. When there are a plurality of $R_1$ and $R_2$, they may be the same or different from each other.

In the general formula (4), $R_4$ represents at least one chemical species selected from the group consisting of a hydrogen atom, an alkyl group, a substituted alkyl group, an aryl group and a substituted aryl group. When there are a plurality of $R_4$, they may be the same or different from each other.

m represents an integer of 2 to 6, preferably an integer of 2 to 4.

n represents an integer of 1 to 1000, preferably an integer of 10 to 250.

p represents an integer of 2 to 6, and two ps may be the same or different from each other.

q and r each represent a positive number. q and r may represent 2 to 100 mol % and 0 to 98 mol % respectively based on the total 100 mol % of q and r. The unit —(CH(CH$_2$CH$_3$)CH$_2$)— and unit —(CH$_2$CH$_2$CH$_2$CH$_2$)— each may be arranged in random or block.

s and t each represent an integer of 1 to 10, preferably an integer of 1 to 3.

The group represented by the above general formula (1) may be a residue formed by removing a hydrogen atom from a (poly)alkylene oxide adduct of alcohol. The group represented by the above general formula (2) may be a residue formed by removing a hydrogen atom from a (poly)alkylene oxide adduct of carboxylic acid. The group represented by the above general formula (3) may be a residue formed by removing a hydrogen atom from (poly)alkylene oxide.

The polyoxymethylene polymer having the block component can be prepared, for example, with reference to the methods described in Japanese Patent Laid-Open No. 57-31918, Japanese Patent Laid-Open No. 60-170652, Japanese Patent Laid-Open No. 2002-3696, Japanese Patent Laid-Open No. 2002-234922, and Japanese Patent Laid-Open No. 2002-3694, or the like.

The block portion of the block copolymer represented by any of general formulae (1) to (7) is obtained by reacting a compound constituting a block having a functional group such as a hydroxyl group at both ends or either one end with the terminal portion of polyoxymethylene resin in the polymerization process.

Examples of the compound in order to achieve general formulae (5) to (7) include an epoxy compound.

The content of the block component represented by any of general formulae (1) to (7) in the block copolymer is not particularly limited, but preferably from 0.001 to 30% by mass, and is more preferably 15% by mass or less, further preferably 10% by mass or less, and especially preferably 8% by mass or less, and is more preferably 0.01% by mass or more, further preferably 0.1% by mass or more, and especially preferably 1% by mass or more, based on 100% by mass of the block copolymer. The content of the block components is preferably 30% by mass or less from the viewpoint of not lowering the rigidity of the molded article of the present embodiment, and preferably 0.001% by mass or more from the viewpoint of maintaining the stable sliding property of the molded article.

The molecular weight of the block component in the block copolymer is preferably 10000 or less, more preferably 8000 or less, and further preferably 5000 or less, from the viewpoint of not lowering the rigidity of the molded article comprising the polyoxymethylene resin composition of the present embodiment. The lower limit of the molecular weight of the block component is not particularly limited, but preferably 100 or more from the viewpoint of maintaining the stable sliding property of the molded article.

Examples of the compound constituting the block component in the block copolymer include, but are not particularly limited to, $C_{18}H_{37}O$ ($CH_2CH_2O)_{40}C_{18}H_{37}$, $C_{11}H_{23}CO_2$($CH_2CH_2O)_{30}H$, $C_{18}H_{37}O(CH_2CH_2O)_{70}H$, $C_{18}H_{37}O$($CH_2CH_2O)_{40}H$, polyethylene glycol having hydroxyl groups at both ends, polypropylene glycol having hydroxyl groups at both ends, hydrogenated polybutadiene having hydroxyl groups at both ends, polyethylene glycol hydroxyalkylated at both ends, polypropylene glycol hydroxyalkylated at both ends, hydrogenated polybutadiene hydroxyalkylated at both ends, (monofunctional or polyfunctional) glycidyl compounds and the like.

Examples of the monofunctional glycidyl compound include, but are not particularly limited to, glycidyl ethers such as methyl glycidyl ether, ethyl glycidyl ether, butyl glycidyl ether, 2-ethylhexyl glycidyl ether, 2-methyl octyl glycidyl ether, phenyl glycidyl ether, p-tert-butylphenyl glycidyl ether, sec-butylphenyl glycidyl ether, n-butyl phenyl glycidyl ether, phenyl phenol glycidyl ether, cresyl glycidyl ether, and dibromo cresyl glycidyl ether, and glycidyl esters such as glycidyl acetate and glycidyl stearate.

Further, examples of the polyfunctional glycidyl compound having 2 or more glycidyl groups, preferably include diglycidyl ether compounds, triglycidyl ether compound and tetraglycidyl ether compounds. Specific examples of the polyfunctional glycidyl compound having 2 or more glycidyl groups include 1,6-hexanediol diglycidyl ether, bisphenol A diglycidyl ether (2,2-bis(4-hydroxyphenyl) propane diglycidyl ether), ethylene glycol diglycidyl ether, propylene glycol diglycidyl ether, 1,4-butanediol diglycidyl ether, hexamethylene glycol diglycidyl ether, resorcinol diglycidyl ether, bisphenol A diglycidyl ether, polyethylene glycol diglycidyl ether, polypropylene glycol diglycidyl ether, polybutylene glycol diglycidyl ether, glycerol triglycidyl ether, trimethylolpropane triglycidyl ether, pentaerythritol tetraglycidyl ether, sorbitol polyglycidyl ether, sorbitan polyglycidyl ether, polyglycerol polyglycidyl ether, and digylcerol polyglycidyl ether.

The block copolymer is preferably an ABA-type block copolymer in arrangement form. By using an ABA-type block copolymer, it is likely that the sliding agent can be more stably, finely dispersed, and it is also likely that a dispersion domain comprising the sliding agent can be present close to the surface layer. As a result, the resin molded article can maintain further enough wear resistance after more than 1,000,000 times of sliding. The ABA-type block copolymer is obtained by reacting a polyoxymethylene segment A and a compound constituting a block having a functional group such as a hydroxyl group at both ends (segment B (hereinafter also referred to as "B")) with terminal portions of polyoxymethylene resin in the polymerization process.

By using, as a compound constituting a block having functional groups such as hydroxyl groups at both ends, for example, a polyalkylene oxide such as a polyethylene glycol having hydroxyl groups at both ends and a hydrogenated polybutadiene having hydroxyl groups at both ends, an ABA-type block copolymer having a block represented by the general formula (3) or (4) as B is obtained.

The block components represented by formula (1), (2), (3) or (4) may have an unsaturated bond having an iodine value of 20 g-$I_2$/100 g or less. Examples of the unsaturated bond include, but are not particularly limited to, a carbon-carbon double bond.

Examples of the polyoxymethylene copolymer having a block component include polyoxymethylene block copolymers disclosed in Japanese Patent Laid-Open No. 60-170652 or International Publication No. WO 01/09213, and such polymers can be prepared with reference to the methods described in these documents.

Further, the ABA-type block copolymer can be obtained by reacting a polyoxymethylene segment A and a compound constituting a block having functional groups such as glycidyl groups (epoxy groups) at both ends (segment B (hereinafter also referred to as "B")) with terminal portions of polyoxymethylene resin in the polymerization process.

By using, as a compound constituting a block having functional groups such as glycidyl groups (epoxy groups) at both ends, for example, 1,6-hexanediol diglycidyl ether and bisphenol A diglycidyl ether (2,2-bis(4-hydroxyphenyl) propane diglycidyl ether), which have a glycidyl group at both ends, an ABA-type block copolymer having a block represented by the general formulae (5) or (6) as B is obtained.

It is preferred to use the glycidyl compound having a molecular weight of 100 to 1000. If the molecular weight of the glycidyl compound is too large, branched or cross-linked chains in the block copolymer obtained by copolymerization become long. This may impair the basic properties by disturbing the crystallinity of the resin or the like, and may develop an unfavorable effect against the object of the present invention, such as impact characteristics. Conversely, if the molecular weight of the glycidyl compound is too small, the effect on the compatibility with sliding agent becomes extremely small.

The block components represented by general formula (5), (6), or (7) may have an unsaturated bond having an iodine value of 20 g-$I_2$/100 g or less. Examples of the unsaturated bond include, but are not particularly limited to, a carbon-carbon double bond.

Examples of the polyoxymethylene copolymer having the block component include polyoxymethylene block copolymers disclosed in Japanese Patent Laid-Open No. 2001-2885, Japanese Patent Laid-Open No. 2002-3694 and Japanese Patent Laid-Open No. 2002-234922, and such polymers can be prepared with reference to the methods described in the documents.

As a polyoxymethylene resin (A) that constitutes the molded article of the polyoxymethylene resin composition of the present embodiment, any one of a polyoxymethylene homopolymer, a polyoxymethylene copolymer, a polyoxymethylene copolymer having a crosslinked structure, a homopolymer-based block copolymer having a block portion, and a copolymer-based block copolymer having a block component can be used, and naturally, these can be used in combination.

Moreover, as a polyoxymethylene resin (A), for example, a combination of copolymers each having a different molecular weight, a combination of polyoxymethylene copolymers each having different amounts of comonomers, and other combinations can be appropriately used.

Among these, in the present embodiment, polyoxymethylene resin (A) preferably comprises a block copolymer.

The rate of the block copolymer in the polyoxymethylene resin (A) is preferably 5 to 95% by mass based on 100% by mass of the whole of polyoxymethylene resin (A). The rate of the block copolymer is more preferably 90% by mass or less, further preferably 75% by mass or less, and especially 65% by mass or less (preferably 60% by mass or less), and is more preferably 10% by mass or more, further preferably 20% by mass or more, and especially 25% by mass or more (preferably 35% by mass or more, more preferably 40% by mass or more).

By setting the content of the block copolymer 95% by mass or less, the friction coefficient due to the block portion can be lowered and the wear resistance becomes more excellent. Further, by setting the content of the block copolymer to 5% by mass or more, the sliding agent becomes hard to move to the surface of the resin molded article, and the resin molded article tends to retain more certainly a uniform and smooth surface.

The rate of the present block copolymer in the molded article comprising the polyoxymethylene resin composition of the present embodiment can be measured by $^1$H-NMR, $^{13}$C-NMR, or the like.

Further, the block portion can be obtained by dissolving the polyoxymethylene resin molded article or composition, and then performing operations such as reprecipitation or filtration to isolate a block copolymer, and then decomposing the block copolymer with hydrochloric acid to isolate and purify a block portion. The structure of the block portion can be determined by subjecting the obtained block portion to various measurements, such as $^1$H-NMR, $^{13}$C-NMR, and two-dimensional NMR.

It is preferred that the block portion of the block copolymer in the molded article comprising the polyoxymethylene resin composition of the present embodiment has a solubility parameter (SP) value of 7.0 to 18.0 $((cal/cm^3)^{1/2})$ as calculated by the Fedors method. The upper limit of the SP value of the block portion of the block copolymer is more preferably 17.0 $((cal/cm^3)^{1/2})$, further preferably 16.0 $((cal/cm^3)^{1/2})$, even more preferably 15.0 $((cal/cm^3)^{1/2})$ and still more preferably 14.0 $((cal/cm^3)^{1/2})$. The lower limit of the SP value of the block portion of the block copolymer is more preferably 7.5 $((cal/cm^3)^{1/2})$, further preferably 7.8 $((cal/cm^3)^{1/2})$, even more preferably 8.0 $((cal/cm^3)^{1/2})$ and still more preferably 8.1 $((cal/cm^3)^{1/2})$. By setting the upper limit of the SP value of the block portion of the block copolymer to the aforementioned range, intermolecular force between the block portions become appropriate, and uniform dispersion of the block copolymer in the resin molded article tends to be good. By setting the lower limit of the SP value to the aforementioned range, intermolecular forces between the sliding agent and the block portion become appropriate, and the dispersibility of the sliding agent in the resin molded article tends to be good.

<<(B) Sliding Agent>>

The sliding agent (B) which can be used in the resin molded article of the present embodiment (hereinafter sometimes referred to as "component (B)" or "(B)") will be described in detail. In the present embodiment, the term "sliding agent" refers to a substance having the effect of reducing friction by blending into the resin composition.

In the present embodiment, component (B) is comprised in an amount of 0.1 to 5 parts by mass based on 100 parts by mass of component (A). When the amount of component (B) based on 100 parts by mass of component (A) is 0.1 parts by mass or more, sliding property of resin molded article is improved, and when the amount is 5 parts by mass or less, peeling of the layer of the resin molded article can be suppressed. The lower limit of the amount of the component (B) is preferably 0.3 parts by mass, more preferably 0.5 parts by mass, and further preferably 1.0 parts by mass based on 100 parts by mass of component (A). The upper limit of the amount of the component (B) is preferably 4.5 parts by mass, more preferably 4 parts by mass, and further preferably 3 parts by mass based on 100 parts by mass of component (A).

Next, examples of the sliding agent (B) in the present embodiment will be described, but the sliding agent (B) is not limited to these examples. The component (B) may be, for example, the compounds having the structure represented by the following general formula (8), (9) or (10).

$$[R_{11}\text{-}(A_1\text{-}R_{12})_x\text{-}A_2\text{-}R_{13}]_y \quad (8)$$

$$A_3\text{-}R_{11}\text{-}A_4 \quad (9)$$

$$R_{14}\text{-}A_5 \quad (10)$$

In the general formulae (8) and (9), $R_{11}$, $R_{12}$ and $R_{13}$ each independently represent an alkylene group having 1 to 7000 carbon atoms, an alkylene group obtained by replacing at least one hydrogen atom of a substituted or non-substituted alkylene group having 1 to 7000 carbon atoms with an aryl group having 6 to 7000 carbon atoms, an arylene group having 6 to 7000 carbon atoms, or an arylene group obtained by replacing at least one hydrogen atom of an arylene group having 6 to 7000 carbon atoms with a substituted or non-substituted alkyl group having 1 to 7000 carbon atoms.

In the general formula (10), $R_{14}$ represents an alkyl group having 1 to 7000 carbon atoms, an alkyl group obtained by replacing at least one hydrogen atom of a substituted or non-substituted alkyl group having 1 to 7000 carbon atoms with an aryl group having 6 to 7000 carbon atoms, an aryl group having 6 to 7000 carbon atoms, or an aryl group obtained by replacing at least one hydrogen atom of an aryl group having 6 to 7000 carbon atoms with a substituted or non-substituted alkyl group having 1 to 7000 carbon atoms.

These groups may be a group comprising a double bond, a triple bond, or a ring structure.

In the general formula (8), $A_1$ and $A_2$ each independently represent an ester bond, a thioester bond, an amide bond, a thioamide bond, an imide bond, a ureido bond, an imine bond, a urea bond, a ketoxime bond, an azo bond, an ether bond, a thioether bond, a urethane bond, a thiourethane bond, a sulfide bond, a disulfide bond, or trisulfide bond.

In the general formula (8), x represents an integer of 1 to 1000, and y represents an integer of 1 to 1000.

In the general formulae (9) and (10), $A_3$, $A_4$ and $A_5$ each independently represent a hydroxyl group, an acyl group, an aldehyde group, a carboxyl group, an acetyl group, an amino group, a sulfo group, an amidine group, an azi group, a cyano group, a thiol group, a sulfenic acid group, an isocyanide group, a ketene group, an isocyanate group, a thioisocyanate group, a nitro group, a thiol group or a carbamoyl group.

From the viewpoint of wear resistance during sliding under a very low load, that is the effect of the present embodiment, it is preferable that structure of the sliding agent (B) represented by above general formula (8), (9) or (10) is within the scope of the following.

$R_{11}$, $R_{12}$, $R_{13}$ and $R_{14}$ each have preferably 2 to 7000, more preferably 3 to 6800, and further preferably 4 to 6500 carbon atoms.

In the general formula (8), x is preferably an integer of 1 to 100, and y is preferably an integer of 1 to 200.

In the general formula (8), it is preferable that $A_1$ and $A_2$ each independently represent an ester bond, a thioester bond, an amide bond, an imide bond, a ureido bond, an imine bond, a urea bond, a ketoxime bond, an ether bond, or a urethane bond. It is more preferable that $A_1$ and $A_2$ each independently represent an ester bond, an amide bond, an imide bond, a ureido bond, an imine bond, a urea bond, a ketoxime bond, an ether bond, or a urethane bond.

In the general formulae (5) and (6), it is preferable that $A_3$, $A_4$ and $A_5$ each independently represent a hydroxyl group, an acyl group, an aldehyde group, a carboxyl group, an acetyl group, an amino group, an azi group, a cyano group, a thiol group, an isocyanide group, a ketene group, an isocyanate group, a thioisocyanate group, or a carbamoyl group. It is more preferable that $A_3$, $A_4$ and $A_5$ each independently represent a hydroxyl group, an acyl group, an aldehyde group, a carboxyl group, an acetyl group, an amino group, a cyano group, an isocyanide group, a ketene group, an isocyanate group, or a carbamoyl group.

Specific examples of the component (B) include, but are not particularly limited to, at least one compound selected from the group consisting of alcohols, amines, carboxylic acids, hydroxy acids, amides and esters, polyoxyalkylene glycols and olefin compounds. It is preferable, from the viewpoint of sliding property under a very low load, that the component (B) is at least one compound selected from the group consisting of alcohols, amines, carboxylic acids, esters, amides and olefin compounds, and further it is more preferable, from the viewpoint of suppressing outgassing and bleed out, that the component (B) is an olefin compound.

The alcohols used in the present embodiment are preferably saturated or unsaturated monovalent or multivalent alcohols having 2 to 7000 carbon atoms. Specific example of the alcohols include, but are not particularly limited to, octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, linolyl alcohol, nonadecyl alcohol, eicosyl alcohol, ceryl alcohol, behenyl alcohol, melissyl alcohol, hexyldecyl alcohol, octyldodecyl alcohol, decyl myristyl alcohol, decyl stearyl alcohol, unilin alcohol, ethylene glycol, diethylene glycol, triethylene glycol, propylene glycol, dipropylene glycol, butanediol, pentanediol, hexanediol, glycerin, diglycerin, triglycerine, threitol, erythritol, pentaerythritol, arabitol, ribitol, xylitol, sorbite, sorbitan, sorbitol, and mannitol. These aliphatic alcohols may be used singly or in combinations of two or more.

Among these, the alcohols having 11 or more carbon atoms are preferred from the viewpoint of the efficiency of sliding property. The alcohols having 12 or more carbon atoms are more preferred, and the alcohols having 13 or more carbon atoms are further preferred. Among these, saturated alcohols are particularly preferred.

Among them, stearyl alcohol, oleyl alcohol, linolyl alcohol, behenyl alcohol, ethylene glycol, propylene glycol, diethylene glycol, triethylene glycol are preferred, and behenyl alcohol, diethylene glycol, and triethylene glycol are preferred.

Examples of the amines used in the present embodiment include, but are not limited to, primary amines, secondary amines, tertiary amines, and special amines.

Examples of the primary amine include, but are not particularly limited to, methylamine, ethylamine, propanamine, butanamine, pentanamine, hexanamine, heptanamine, octanamine, cyclohexylamine, ethylenediamine, aniline, menthanediamine, isophoronediamine, xylenediamine, meta-phenylenediamine, and diaminodiphenylamine.

Example of the secondary amine include, but are not particularly limited to, dimethylamine, diethylamine, N-methylethylamine, diphenylamine, tetramethylethylenediamine, piperidine, and N,N-dimethylpiperazine.

Examples of the tertiary amine include, but are not particularly limited to, trimethylamine, triethylamine, hexamethylenediamine, N,N-diisopropylethylamine, pyridine, N,N-dimethyl-4-aminopyridine, triethylenediamine, and benzyldimethylamine.

Examples of the special amine include, but are not particularly limited to, diethylenetriamine, triethylenetetramine, tetraethylenepentamine, diethylaminopropylamine, and N-aminoethylpiperazine.

These amines may be used singly or in combinations of two or more.

Among these, hexanamine, heptanamine, octanamine, tetramethylethylenediamine, N,N-dimethylpiperazine, hexamethylenediamine are preferred, and heptanamine, octanamine, tetramethylethylenediamine, hexamethylenediamine are more preferred.

The carboxylic acids used in the present embodiment are preferably saturated or unsaturated, monohydric or polyhydric aliphatic carboxylic acid having 6 to 7000 carbon atoms. Specific examples of the carboxylic acids include, but are not particularly limited to, caproic acid, enanthic acid, caprylic acid, undecyl acid, pelargonic acid, lauric acid, tridecyl acid, myristic acid, pentadecyl acid, palmitic acid, margaric acid, stearic acid, nonadecanoic acid, arachic acid, behenic acid, lignoceric acid, cerotic acid, heptacoic acid, montanic acid, adipic acid, pimelic acid, suberic acid, azelaic acid, sebacic acid, melissic acid, lacceric acid, undecylenic acid, elaidic acid, cetoleic acid, brassidic acid, sorbic acid, palmitoleic acid, oleic acid, vaccenic acid, linoleic acid, linolenic acid, eleostearic acid, arachidonic acid, nervonic acid, erucic acid, propiolic acid, and stearolic acid.

Among these, the fatty acids having 10 or more carbon atoms are preferred from the viewpoint of the efficiency of sliding property. The fatty acids having 11 or more carbon atoms are more preferred, and the fatty acids having 12 or more carbon atoms are further preferred. Among these, saturated carboxylic acids are preferred. Among these saturated fatty acids, palmitic acid, stearic acid, behenic acid, montanic acid, adipic acid, sebacic acid, and the like are also preferred from the viewpoint that they are industrially easily available.

The carboxylic acids may be naturally-occurring fatty acids or a mixture of these which comprise such components. These fatty acids may be substituted with hydroxy group, and may be a synthetic fatty acid obtained by carboxyl-modifying the terminal of unilin alcohol which is a synthetic aliphatic alcohol.

Examples of the hydroxy acids used in the present embodiment include, but are not particularly limited to, aliphatic hydroxy acids and aromatic hydroxy acids. Examples of the aliphatic hydroxy acid include, but are not particularly limited to, glycolic acid, hydroxypropionic acid, hydroxybutanoic acid, hydroxypentanoic acid, hydroxyhexanoic acid, hydroxyheptanoic acid, hydroxynonanoic acid, hydroxydecanoic acid, hydroxyundecanoic acid, hydroxydodecanoic acid, hydroxytridecanoic acid, hydroxytetradecanoic acid, hydroxypentadecanoic acid, hydroxyhexadecanoic acid, hydroxyheptadecanoic acid, hydroxyoctadecanoic acid, hydroxynonadecanoic acid, hydroxyicosanoic acid, hydroxydocosanoic acid, hydroxytetradocosanoic acid, hydroxyhexadocosanoic acid, hydroxyoctadocosanoic acid, lactic acid, tartronic acid, glyceric acid, hydroxybutyric acid, 2-hydroxybutyric acid, 3-hydroxybutyric acid, γ-hydroxybutyric acid, malic acid, tartaric acid, citramalic acid, citric acid, isocitric acid, leucic acid, mevalonic acid, pantoic acid, ricinoleic acid, ricinelaidic acid, cerebronic acid, quinic acid, and shikimic acid. The isomers of these can also be used.

Examples of the aromatic hydroxy acid include, but are not particularly limited to, monohydroxybenzoic acid derivatives, such as salicylic acid, creosotic acid (homosalicylic acid, hydroxy(methyl) benzoic acid), vanillic acid, or syringic acid; dihydroxybenzoic acid derivatives, such as pyrocatechuic acid, resorcylic acid, protocatechuic acid, gentisic acid, and orsellinic acid; trihydroxybenzoic acid derivatives, such as gallic acid; phenylacetic acid derivatives, such as mandelic acid, benzylic acid, and atrolactic acid; and cinnamic acid or hydrocinnamic acid derivatives, such as melilotic acid, phloretic acid, coumaric acid, umbellic acid, caffeic acid, ferulic acid, and sinapic acid. The isomers of these can also be used.

These hydroxy acid compounds may be used singly or in combinations of two or more.

Among these, fatty hydroxy acids are preferred, fatty hydroxy acids having 5 to 30 carbon atoms are more preferred, and fatty hydroxy acids having 8 to 28 carbon atoms are further preferred.

The amides used in the present embodiment are preferably a saturated or unsaturated monovalent or polyvalent aliphatic amides having 6 to 7000 carbon atoms. Specific examples of the amides include, but are not particularly limited to, primary amides, such as heptanamide, octanamide, nonanamide, decanamide, undecanamide, laurylamide, tridecyl amide, myristylamide, pentadecylamide, cetylamide, heptadecylamide, stearylamide, oleylamide, nonadecylamide, eicosylamide, silylamide, behenylamide, melissylamide, hexyldecylamide, octyldodecylamide, lauric acid amide, palmitic acid amide, stearic acid amide, behenic acid amide, hydroxystearic acid amide, oleic acid amide, erucic acid amide, and other saturated or unsaturated amides.

Examples of the secondary amides include, but are not limited to, N-oleyl palmitic acid amide, N-stearyl stearic acid amide, N-stearyl oleic acid amide, N-oleyl stearic acid amide, N-stearyl erucic acid amide, methylenebis stearic acid amide, ethylenebis capric acid amide, ethylenebis lauric acid amide, ethylenebis stearic acid amide, ethylenebis hydroxystearic acid amide, ethylenebis behenic acid amide, ethylenebis oleic acid amide, ethylenebis erucic acid amide, hexamethylenebis stearic acid amide, hexamethylenebis behenic acid amide, hexamethylenebis oleic acid amide, hexamethylene hydroxystearic acid amide, and other saturated or unsaturated amides.

Examples of tertiary amides include, but are not limited to, N,N-distearyl adipic acid amide, N,N-distearyl sebacic acid amide, N,N-dioleyl adipic acid amide, N,N-dioleyl sebacic acid amide, N,N-distearyl isophthalic acid amide, and other saturated or unsaturated amides.

Among these, palmitic acid amide, stearic acid amide, behenic acid amide, hydroxystearic acid amide, oleic acid amide, erucic acid amide, N-stearyl stearic acid amide, methylene bis-stearic acid amide, ethylene bis lauric acid amide, ethylenebis stearic acid amide and ethylenebis behenic acid amide can be preferably used. Among these, the amides having 10 or more carbon atoms are preferred from the viewpoint of the efficiency of sliding property. The amides having 11 or more carbon atoms are more preferred, and the amides having 13 or more carbon atoms are further preferred. Among these, saturated aliphatic amides are particularly preferred.

The esters used in the present embodiment are preferably reaction products in which the aforementioned alcohol has been reacted with carboxylic acid or hydroxy acid to form an ester bond.

Examples of the ester include, but are not particularly limited to, butyl stearate, 2-ethylhexyl palmitate, 2-ethylhexyl stearate, glycerol monobehenate, cetyl 2-ethylhexanoate, isopropyl myristate, isopropyl palmitate, cholesteryl isostearate, methyl laurate, methyl oleate, methyl stearate, cetyl myristate, myristyl myristate, octyldodecyl myristate, pentaerythritol monooleate, pentaerythritol monostearate, pentaerythritol tetrapalmitate, stearyl stearate, isotridecyl stearate, glycerol tris(2-ethylhexanoate), diisodecyl adipate, ethylene glycol monolaurate, ethylene glycol dilaurate, ethylene glycol monostearate, ethylene glycol distearate, triethylene glycol monostearate, triethylene glycol distearate, ethylene glycol monooleate, ethylene glycol dioleate, polyethylene glycol monolaurate, polyethylene glycol monostearate, polyethylene glycol distearate, polyethylene glycol monooleate, glycerol monostearate, glycerol distearate, glycerol monolaurate, glycerol dilaurate, glycerol monooleate, and glycerol dioleate.

Among these, cetyl myristate, diisodecyl adipate, ethylene glycol monostearate, ethylene glycol distearate, triethylene glycol monostearate, triethylene glycol distearate, polyethylene glycol monostearate and polyethylene glycol distearate are preferred, and cetyl myristate, diisodecyl adipate, and ethylene glycol distearate are more preferred.

The polyoxyalkylene glycols used in the present embodiment include, but are not limited to, the following three types.

The first polyoxyalkylene glycol is a polycondensate comprising alkylene glycol as a monomer. Examples of such a polycondensate include, but are not limited to, polyethylene glycol, polypropylene glycol, and a block copolymer or a random copolymer of ethylene glycol and propylene glycol. The polymerization degree of these polycondensates is preferably in the range of 5 to 2500, and more preferably in the range of 10 to 2300.

The second polyoxyalkylene glycol is an ether compound of the polycondensate described in the above first polyoxyalkylene glycol and aliphatic alcohol. Examples of such an ether compound include, but are not limited to, polyethylene glycol oleyl ether (polymerization degree of ethylene oxide: 5 to 500), polyethylene glycol cetyl ether (polymerization degree of ethylene oxide: 5 to 500), polyethylene glycol stearyl ether (polymerization degree of ethylene oxide: 5 to 300), polyethylene glycol lauryl ether (polymerization degree of ethylene oxide: 5 to 300), polyethylene glycol tridecyl ether (polymerization degree of ethylene oxide: 5 to 300), polyethylene glycol nonylphenyl ether (polymerization degree of ethylene oxide: 2 to 1000), and polyethylene glycol octylphenyl ether (polymerization degree of ethylene oxide: 4 to 500).

The third polyoxyalkylene glycol is an ester compound of the polycondensate described in the first polyoxyalkylene glycol and a higher fatty acid. Examples of such an ester compound include, but are not limited to, polyethylene glycol monolaurate (polymerization degree of ethylene oxide: 2 to 300), polyethylene glycol monostearate (polymerization degree of ethylene oxide: 2 to 500), and polyethylene glycol monooleate (polymerization degree of ethylene oxide: 2 to 500).

Examples of the olefin compound used in the present embodiment include polyethylene (high-pressure low-density polyethylene, linear low density polyethylene, ultra-low density polyethylene), polypropylene, ethylene-propylene copolymer, ethylene-butene copolymer, ethylene-octene copolymer, polypropylene-butene copolymer, polybutene, polybutadiene hydrogenated compound, ethylene-acrylic acid ester copolymer, ethylene-methacrylic acid ester copolymer, ethylene-acrylic acid copolymer, and ethylene-vinyl acetate copolymers. These olefin compounds may be a non-modified compound or a modified compound. When it is a modified compound, it may be an acid-modified (or also referred to as oxide-modified) compound. Further, these olefin compounds may be in the form of a graft copolymer or in the form of a wax.

These olefin compounds may be used singly or in combinations of two or more.

Among these olefin compounds, from the viewpoint of easy availability and processability, at least one selected from the group consisting of polyethylene, polypropylene, ethylene-propylene copolymer, ethylene-butene copolymer, ethylene-propylene-butene copolymer and ethylene-octene copolymer is preferred, and at least one selected from the group consisting of polyethylene and polypropylene is preferred.

Examples of the wax include, but are not particularly limited to, shellac wax, beeswax, spermaceti, shellac wax, wool wax, carnauba wax, tallow, rice bran wax, candelilla wax, Japan wax, paraffin wax, microcrystalline wax, montan wax, Fischer-Tropsch wax, polyethylene wax, polypropylene wax, and their high-density polymerization-based wax, low-density polymerization-based wax, oxidized wax, acid-modified-based wax, or special monomer-modified-based wax.

Among these, carnauba wax, rice bran wax, candelilla wax, paraffin wax, montan wax, polyethylene wax, polypropylene wax, and their high-density polymerization-based wax, low-density polymerization-based wax, oxidized wax, acid-modified-based wax, or special monomer-modified-based wax are preferred, and further, carnauba wax, rice bran wax, candelilla wax, paraffin wax, polyethylene wax, polypropylene wax, and their high-density polymerization-based wax, low-density polymerization-based wax, oxidized wax, acid-modified-based wax, or special monomer-modified-based wax are more preferred.

These olefin compounds may be an acid-modified olefin compound (or also referred to as oxide-modified compound). The oxide-modified or acid-modified olefin compound can be obtained, without particularly limiting to, by the method of introducing an acidic group by an oxidation reaction of the polyolefin (wax), the method of oxidatively decomposing polyolefins, the method of introducing a polar group such as a carboxyl group or a sulfonic acid group by the reaction with an inorganic acid, an organic acid or an unsaturated carboxylic acid, the method of introducing a monomer having an acidic group at the time of the polyolefin wax polymerization, or other methods. These are commercially available under the name such as acid-modified or oxide-modified polyolefin (wax), thus it is readily available.

Examples of the polyolefin wax include, but are not particularly limited to, paraffin wax, microcrystalline wax, montan wax, Fischer-Tropsch wax, polyethylene wax, polypropylene wax, and their high-density polymerization-based wax, low-density polymerization-based wax, or special monomer-modified-based wax.

From the viewpoint of improving sliding property effect, the component (B) is preferably paraffin wax, polyethylene wax, acid-modified compound of polypropylene wax, polyethylene (high-pressure low-density polyethylene, linear low density polyethylene, ultra-low density polyethylene), polypropylene, ethylene-propylene copolymer, acid modified compound of ethylene-butene copolymer. In particular, it is preferable that the component (B) is a modified wax comprising an acid-modified polyethylene and/or acid-modified polypropylene.

The component (B) may be used singly or in combinations of two or more.

In the present embodiment, the component (B) can be separated from the polyoxymethylene resin molded article to calculate the molecular structure, molecular weight, melting point, acid value, viscosity, or the like.

The component (B) of the polyoxymethylene resin molded article in the present embodiment can be obtained by dissolving the polyoxymethylene resin molded article or composition, and then isolating the component (B) by performing operations such as filtration, and then purifying the component (B) by performing operations such as recrystallization and reprecipitation. By subjecting component (B) to various measurements, such as $^1$H-NMR, $^{13}$C-NMR, two-dimensional NMR, and MALDI-TOF MS, the molecular structure of component (B) such as repeating structure, branched structure, and positional information of various functional groups, can be determined.

It is preferred that the acid value of component (B) (in particular, in the case of an acid-modified polyethylene and/or acid-modified polypropylene) is preferably more than 0 mg KOH/g (preferably 1 mg KOH/g or more) and 85 mg KOH/g or less. The acid value of 1 mg KOH/g or more tends to improve the dispersibility of the component (B). The acid value of 85 mg KOH/g or less tends to further improve discoloration resistance upon drying, as well as tends to further improve wear resistance to sliding at high temperatures under a very low load. The upper limit of the acid value is more preferably 80 mg KOH/g, further preferably, 83 mg KOH/g, and in particular 80 mg KOH/g (preferably the acid value is 75 mg KOH/g). The acid value may be determined in accordance with JIS K 0070.

The acid value of component (B) can be adjusted or controlled by adjusting or controlling the introduction amounts of an acidic group or a polar group, by performing the methods described in Example 1 or 2 of Japanese Patent Laid-Open No. 2004-75749 or in Example 1 of Japanese Patent Laid-Open No. 62-167308, or by performing the thermal decomposition of commercial high density polyethylene under oxygen atmosphere. Further, when the component (B) is an acid-modified polyethylene and/or acid-modified polypropylene, products having such acid values are commercially available.

The melt viscosity at 140° C. of the component (B) (in particular, in the case of an acid-modified polyethylene and/or acid-modified polypropylene) is preferably 1 to 3000 mPa·s. By setting the melt viscosity at 140° C. to 1 mPa·s or more, the processability during melt-kneading of the polyoxymethylene resin composition of the present embodiment tends to be further improved. From the similar viewpoint, the lower limit of the melt viscosity at 140° C. is more preferably 20 mPa·s or less, further preferably 25 mPa·s or less, especially 30 mPa·s (preferably, 50 mPa·s). By setting the melt viscosity at 140° C. of component (B) to 3000 mPa·s or less, the processability during melt-kneading of the polyoxymethylene resin composition of the present embodiment tends to be further improved. From the similar viewpoint, the upper limit of the melt viscosity at 140° C. is preferably 2850 mPa·s, more preferably 2800 mPa·s, further preferably 2700 mPa·s, and especially 2650 mPa·s (preferably, 2000 mPa·s).

The melt viscosity at 180° C. of the component (B) (in particular, in the case of an acid-modified polyethylene and/or acid-modified polypropylene) is preferably 100 to 2900 mPa·s. By setting the melt viscosity at 180° C. to the aforementioned range, when melt-kneading the polyoxymethylene resin composition of the present embodiment, the kneading tends to be performed sufficiently, since the polyoxymethylene resin pellets are completely melted. From the similar viewpoint, the lower limit of the melt viscosity at 180° C. is more preferably 110 mPa·s, further preferably 140 mPa·s, especially 160 mPa·s (preferably, 300 mPa·s). From the similar viewpoint, the upper limit of the melt viscosity at 180° C. is more preferably 2850 mPa·s, further preferably 2800 mPa·s, and especially 2700 mPa·s (preferably, 2650 mPa·s, more preferably 2000 mPa·s, and further preferably, 1600 mPa·s).

When the component (B) is acid-modified polyethylene and/or acid-modified polypropylene, the melt viscosities at 140° C. and at 180° C. can be measured by a Brookfield viscometer.

In the present embodiment, the lower limit of weight average molecular weight of the sliding agent, the component (B) constituting the resin molded article, is preferably 700, more preferably 800, further preferably 900, and most preferably 1000, from the viewpoint of outgassing and bleed out. The upper limit of weight average molecular weight of the sliding agent, the component (B), is not particularly limited, but preferably about 100,000 from the viewpoint of easy handling.

The lower limit of the molecular weight distribution of the component (B) used in the present embodiment is not particularly limited, but from the viewpoint of the stability of the friction coefficient during sliding, may be 1.0 as a rough indication. Further, the upper limit of the molecular weight distribution of the component (B) is preferably 9.0, more preferably 8.5, further preferably 8.0, and even more preferably 7.5. The weight average molecular weight of the component (B) of the present embodiment is determined by liquid chromatography/mass spectrometry when the weight average molecular weight of the component (B) is 1000 or less, and is determined by gel permeation chromatography and represented by the weight average molecular weight in terms of polystyrene standards or the like, when the weight average molecular weight of the component (B) is more than 1000.

The melting point of the component (B) of the present embodiment is preferably 40 to 150° C. By setting the melting point of component (B) to 40° C. or more, the resin molded article tends to have improved wear resistance at a higher temperature, and by setting the melting point of component (B) to 150° C. or less, it becomes likely to achieve good dispersion of the component (B) to the resin during processing. The lower limit of the melting point of component (B) is more preferably 45° C., further preferably 50° C., and especially preferably 80° C. The upper limit of the melting point of component (B) is more preferably 140° C., further preferably 135° C., and especially preferably 130° C.

The melting point of component (B) of the present embodiment can be measured by the method in accordance with JIS K 7121 (DSC method).

Of the sliding agent described above, when the sliding agent comprises a compound having a carbonyl group, the peak intensity ratio (P/Q) of peak intensity P derived from C—O stretching vibration to peak intensity Q derived from C=O stretching vibration in the surface of a molded article as measured by infrared spectroscopy is preferably 200 to 5000.

A method for obtaining the value of the peak intensity ratio P/Q as measured by infrared spectroscopy according to the present embodiment will be described below.

The peak intensity ratio (P/Q) in the surface of a resin molded article can be easily obtained by measuring and analyzing the surface of a resin molded article according to an attenuated total reflection method (ATR method) using an infrared spectrophotometer For such a measurement, commercially available measurement device such as Spectrum One, manufactured by Perkin-Elmer, or the like can be used.

The ATR method is a measurement method for obtaining information regarding a surface condition by utilizing the phenomenon in which infrared light entering into a crystal that has been allowed to come into contact with a resin molded article is absorbed into the surface of the resin molded article, while it reflects in the crystal several times. At this time, in the surface of the molded article, a phenomenon called evanescent wave takes place, where infrared ray permeates into the molded article. The depth is approximately several μm, although it is somewhat different depending on wavelength or the type of the crystal. That is to say, the peak intensity ratio P/Q in the surface of the resin molded article, which is measured and analyzed by the attenuated total reflection method (ATR method) using an infrared spectrophotometer, indicates information regarding the depth that is several μm from the surface layer of the molded article. In the present embodiment, the crystal used in the ATR method is preferably diamond/ZnSe from the viewpoint of deep permeation.

The obtained spectrum is analyzed as an absorbance ratio. Specifically, peak intensity (peak height) P from 1040 cm$^{-1}$ to 1160 cm$^{-1}$ is calculated as a signal of C—O (derived from the repeating structure of polyoxymethylene), and peak intensity Q from 1600 cm$^{-1}$ to 1750 cm$^{-1}$ is calculated as a signal of C=O. Then, the peak intensity ratio (P/Q) is defined as a peak intensity ratio in the surface of the resin molded article. At this time, in order to eliminate errors, as baselines upon obtaining the peak intensity, a straight line is drawn from 1040 cm$^{-1}$ to 1160 cm$^{-1}$, and from 1590 cm$^{-1}$ to 1760 cm$^{-1}$, respectively, and the height from the baseline is then read out as peak intensity.

The peak intensity ratio P/Q in the surface of the molded article of the polyoxymethylene resin composition of the present embodiment means an indicator for the amount of the after-mentioned sliding agent (B) constituting the resin molded article of the present embodiment that is present close to the surface layer (within several μm in depth).

The present peak intensity ratio P/Q is preferably 200 to 5000. The value of the peak intensity ratio that exceeds 5000 indicates that there are few carbonyl groups due to the sliding agent (B) constituting the resin molded article of the present embodiment mentioned below near the surface layer. On the other hand, the value that is less than 200 indicates that there are a large amount of carbonyl groups due to a sliding agent unevenly distributed near the surface layer. From the viewpoints of sufficiently maintaining high sliding properties after more than 1,000,000 times of sliding (times of rubbing) and suppressing deterioration of wear in the surface layer due to the peeling of surface layer, the peak intensity ratio (P/Q) in the surface of the resin molded article is preferably set to between 200 and 5000.

The upper limit of the peak intensity ratio (C—O/C=O) in the surface of the resin molded article according to the present embodiment is more preferably 4500, further preferably 3000, and even more preferably 1500. On the other hand, the lower limit of the peak intensity ratio (C—O/C=O) in the surface of the resin molded article is more preferably 210, further preferably 220, and even more preferably 250.

The difference between the SP values of the block portion of the block copolymer comprised in the polyoxymethylene resin and of the sliding agent is preferably 5 or less, more preferably 3 or less, and further preferably 2 or less, from the viewpoint of sliding properties under a very low load.

In addition to the sliding property under a very low load at room temperature (e.g. 23° C.), sliding property under other environments (temperature and/or load) can also be improved.

For example, as component (B), by using (1) one having an acid value of 38 to 80 mg KOH/g, the sliding property under a very low load at a high temperature (e.g., 70° C.) can be further improved.

By using, as component (B), (2) one having an acid value of 2 to 25 mg KOH/g and a melt viscosity at 140° C. of 2900 mPa·s or less, the sliding property under a very low load at a very low temperature (e.g., −30° C.) can be further improved.

By using, as component (B), (3) one having an acid value of 1 to 75 mg KOH/g and a molecular weight of 100 to 2500, the sliding property under a very low load at a low temperature (e.g., −5° C.) can be further improved.

By using, as component (B), (4) one having an acid value of 1 to 75 mg KOH/g and a melt viscosity at 180° C. of 100 to 2500 mPa·s or less, the sliding property under a high load can be further improved.

<<(C) Coloring Agent>>

The polyoxymethylene resin composition of the present embodiment may comprise a coloring agent (C) as an additional component (or an optional component). In the following, the coloring agent (C) will be described in detail.

The coloring agent (C) means a substance providing a change of appearance by actions such as absorption, scattering, reflection, etc. of visible light.

From the viewpoint of obtaining more excellent wear resistance, it is preferred that the polyoxymethylene resin composition of the present embodiment comprises 0.01 to 3 parts by mass of the coloring agent (C) (hereinafter also referred to as "component (C)" or "(C)") based on 100 parts by mass of a polyoxymethylene resin (A). From the similar viewpoint, it is more preferred that the composition comprises 0.1 to 2 parts by mass of the coloring agent (C), and further preferred that the composition comprises 0.2 to 1 part by mass of the coloring agent (C) based on 100 parts by mass of a polyoxymethylene resin.

In the present embodiment, the coloring agent (C) existing in the molded article of the polyoxymethylene resin composition plays an important role of further improvement of wear resistance by being combined with the component (B), as well as the role of coloration that is the original purpose thereof.

The reason why the presence of the coloring agent (C) improves the sliding property is not clear, but, without limiting the present invention, it is considered that the coloring agent (C) improves the surface hardness of the molded article, thereby improving wear resistance, and is also considered that the coloring agent (C) retains and unevenly distributes the component (B) close to the surface layer.

Examples of the coloring agent (C) include, but are not limited to, inorganic pigments, organic dyes and pigments, and the like. Examples of the inorganic pigment include inorganic pigments which are commonly used for coloring of the resin. Examples of the inorganic pigment include, but are not limited to, an oxide of at least one metal selected from the group consisting of iron, zinc and titanium, a carbonate of at least one metal selected from the group consisting of iron, zinc and titanium, zinc sulfide, titanium oxide, zinc oxide, iron oxide, barium sulfate, titanium dioxide, barium sulfate, hydrous chromium oxide, chromium oxide, aluminum cobalt, barite powder, zinc yellow one, zinc yellow two, ferrocyanide potassium, kaolin, titanium yellow, cobalt blue, ultramarine blue, cadmium, nickel titanium, lithopone, strontium, amber, sienna, azurite, malachite, azuro malachite, orpiment, riaruga, cinnabar, turquoise, rhodochrosite, yellow ocher, tail belt, raw sienna, raw amber, kassel earth, chalk, gypsum, burnt sienna, burnt amber, lapis lazuli, azurite, malachite, coral powder, white mica, cobalt blue, cerulean blue, cobalt violet, cobalt green, zinc white, titanium white, light red, chrome oxide green, mars black, birijan, yellow ocher, alumina white, cadmium yellow, cadmium red, vermilion, talc, white carbon, clay, mineral violet, rose cobalt violet, silver white, gold powder, bronze powder, aluminum powder, prussian blue, oreorin, talc, wollastonite, mica titanium, carbon black, acetylene black, lamp black, furnace black, vegetable black, bone charcoal, calcium carbonate, and navy blue. It should be noted that the aforementioned "metal oxide" includes "composite metal oxide" which comprises two or more metals selected from iron, zinc and titanium.

These inorganic pigments may be used singly or in combinations of two or more.

The coloring agent (C) is preferably an oxide of at least one metal selected from the group consisting of iron, zinc and titanium, a carbonate of at least one metal selected from the group consisting of iron, zinc and titanium, zinc sulfide, zinc oxide, iron oxide, zinc yellow one, zinc yellow two, zinc white, titanium white, alumina white, talc, white carbon, silver white, carbon black, acetylene black, lamp black, furnace black, or calcium carbonate.

Among these, from the viewpoint of the wear resistance of the polyoxymethylene resin composition of the present embodiment, the coloring agent having a Mohs hardness of 8 or less can be preferably used. The Mohs hardness is more preferably 7 or less, and further preferably 6 or less. The Mohs hardness of the coloring agent (C) can be measured by a Mohs hardness scale.

Examples of the organic dye and pigment include, but are not limited to, condensed azo-based, quinone-based, phthalocyanine-based, monoazo-based, diazo-based, polyazo-based, anthraquinone-based, heterocyclic-based, perinone-based, quinacridone-based, thioindigo-based, perylene-based, dioxazine-based and phthalocyanine-based organic dyes and pigments.

From the viewpoint of the heat stability of the polyoxymethylene resin composition of the present embodiment, the organic dye and pigment is preferably condensed azo-based, quinone-based, phthalocyanine-based, anthraquinone-based, heterocyclic-based, perinone-based, quinacridone-based, thioindigo-based, perylene-based, dioxazine-based or phthalocyanine-based organic dyes and pigments. More preferably, the organic dye and pigment is condensed azo-based, quinone-based, phthalocyanine-based, anthraquinone-based, heterocyclic-based, perinone-based, quinacridone-based, perylene-based, or phthalocyanine-based organic dyes and pigments. Further preferably, the organic dye and pigment is quinone-based, phthalocyanine-based, anthraquinone-based, heterocyclic-based, quinacridone-based, perylene-based, or phthalocyanine-based organic dyes and pigments.

These organic dyes and pigments may be used singly or in combinations of two or more.

The upper limit of the content of the coloring agent (C) comprised in the polyoxymethylene resin composition of the present embodiment is, based on 100 parts by mass of a polyoxymethylene resin (A), more preferably 2.5 parts by mass, further preferably 2.0 parts by mass, even more preferably 1.5 parts by mass, still more preferably 1.0 part by mass, especially preferably 0.8 parts by mass.

The lower limit of the content of the coloring agent (C) is, based on 100 parts by mass of a polyoxymethylene resin (A), more preferably 0.03 parts by mass, further preferably 0.05 parts by mass, and even more preferably 0.1 parts by mass.

By setting the content of coloring agent (C) to 3 parts by mass or less as described above, the polyoxymethylene resin composition of the present embodiment can have enough effect of improving the wear characteristics during sliding under a very low load.

On the other hand, by setting the content of coloring agent (C) to 0.01 parts by mass or more, the polyoxymethylene resin composition of the present embodiment can maintain enough coloring.

<<Other Additives>>

The polyoxymethylene resin composition of the present embodiment can comprise various types of conventionally known stabilizers that have been used in polyoxymethylene resin compositions, in a range in which the stabilizers do not impair the object of the present invention. Examples of the stabilizer include, but are not limited to, the below-mentioned antioxidants, and formaldehyde or formic acid scavengers.

These stabilizers may be used singly or in combinations of two or more.

From the viewpoint of the improvement of the heat stability of the polyoxymethylene resin composition of the present embodiment, the above-mentioned antioxidant is preferably a hindered phenol-based antioxidant. The hindered phenol-based antioxidant is not particularly limited, and known antioxidants can be used as appropriate.

Example of the formaldehyde or formic acid scavenger include, but are not limited to, formaldehyde reactive nitrogen-containing compounds such as melamine or a polyamide-based resin and polymers thereof, hydroxides of alkaline metals or alkaline-earth metals, inorganic acid salts, and carboxylic acid salts. Specific examples include calcium hydroxide, calcium carbonate, calcium phosphate, calcium silicate, calcium borate, and fatty acid calcium salts (calcium stearate, calcium myristate, and the like). The fatty acid may be substituted with a hydroxyl group.

With regard to the addition amount of each of the aforementioned stabilizers, based on 100 parts by mass of the polyoxymethylene resin (A), the amount of an antioxidant, for example, a hindered phenol-based antioxidant is preferably 0.1 to 2 parts by mass, the amount of a formaldehyde or formic acid scavenger, for example, a polymer comprising formaldehyde reactive nitrogen, is preferably 0.1 to 3 parts by mass, and the amount of fatty acid salt of alkaline-earth metal is preferably 0.1 to 1 part by mass.

<<Method for Producing the Polyoxymethylene Resin Molded Article of the Present Embodiment>>

The polyoxymethylene resin molded article of the present embodiment can be obtained, for example, by melt-kneading the polyoxymethylene resin (A), the sliding agent (B), optionally the coloring agent (C) and the other additives. The polyoxymethylene resin molded article of the present embodiment comprises 100 parts by mass of a polyoxymethylene resin (A) and 0.1 to 5 parts by mass of a sliding agent (B), wherein two or more dispersion domains of the sliding agent (B) are present in a region of 500 nm in depth from a surface of the molded article and 12000 nm in width, and the dispersion domain has an average minor diameter of 300 nm or less, and an average major diameter of 5000 nm or less.

In a method for producing the polyoxymethylene resin molded article of the present embodiment, any known methods can be used. For example, a single-screw extruder, a multiple-screw extruder, a roll, a banbury mixer, or the like can be used. Among them, a twin-screw extruders equipped with a vacuum unit, a side feeder or the like, can be particularly preferably used.

Examples of the method of mixing and melt-kneading raw material components include: a method which comprises previously mixing all of component (A) and component (B) using a super-mixer, a tumbler, a V-shaped blender or the like, and then melt-kneading the obtained mixture all at once with a twin-screw extruder; a method which comprises previously supplying component (A) to a twin-screw extruder or the like, and then melt-kneading, while adding thereto component (B) which has been melted to be a liquid state through the middle part of the extruder; a method which comprises supplying a part of component (A) and component (B) to the twin screw extruder from the top, while supplying the remaining part of component (A) to the twin screw extruder from the side, and then melt-kneading the combined components; and a method which comprises supplying a part of component (A) and component (B) to the twin screw extruder from the top, while pulverizing the remaining part of component (A) then supplying the pulverized component to the twin screw extruder from the top, and then melt-kneading the combined components.

The polyoxymethylene resin molded article of the present embodiment is preferably obtained by the method which comprises supplying a part of the component (A) and component (B) to the twin screw extruder from the top, while pulverizing the remaining part of component (A), then supplying the pulverized component to the twin screw extruder from the top, and then melt-kneading the combined components. This method is preferred from the viewpoint of achieving well dispersibility of the component (B) and easily obtaining a special surface layer described above.

When prepared using the extruder described above, the polyoxymethylene resin composition of the present embodiment is obtained, for example, as a pellet-shaped molded article.

<<Intended Use>>

The polyoxymethylene resin composition of the present embodiment and the molded article comprising the resin composition can be suitably used for intended use in which repeated sliding is required under a very low load.

Specific examples of such intended use include internal components for hard disk (such as a ramp for a hard disk, a latch material) and internal components for watches (such as a gear, a balance, an anchor striker, and an escape wheel). Other than these, since the molded article comprising the polyoxymethylene resin composition of the present embodiment has high sliding properties, it can be applied to known intended uses of polyoxymethylene. More specifically, examples of the intended uses include, but are not limited to, mechanism parts representatively including a cam, a slider, a lever, an arm, a clutch, a felt clutch, an idle gear, a pulley, a roller, a roll, a key stem, a key top, a shutter, a reel, a shaft, a joint, an axis, a bearing, and a guide; components for office automation equipment, representatively including a resin component used for outsert molding, a resin component used for insert molding, a chassis, a tray, a lateral plate, a printer, and a copying machine; components for video equipment, such as digital video camera and digital camera; drives for CD, DVD, Blu-ray Disc, and other optical disks; components used for music, video or information devices, representatively including navigation system and mobile personal computer, and components for communication equipment representatively including portable phones and facsimiles; components for electric equipment; and components for electronic equipment.

Moreover, examples of the automobile component include fuel-related components representatively including a gasoline tank, a fuel pump module, valves, and a gasoline tank flange; door-related components representatively including a door lock, a door handle, a window regulator, and a speaker grill; seat belt-related components representatively including slip ring for seat belt and press button; and other components such as combination switch components, and components for switches and clips.

Further, examples of other products, to which the present resin molded article can be suitably used, include pen points of writing materials, and mechanism parts for taking in or out pen points; parts for washing stands, drain outlets, and drain valve-opening and closing mechanisms; a code stopper, an adjuster and a button for clothes; nozzles for water-sprinkling and water-sprinkling hose-connected joints; building supplies that are stair handrail portions and floor material-supporting portions; toys, fasteners, chains, conveyers, buckles, sporting goods, vending machines (parts for opening/closing section locking mechanism and good-emitting mechanism), and components for furniture, musical instrument, and housing equipment.

EXAMPLES

Hereinafter the present embodiment will be described by way of specific Examples and Comparative Examples, but the present embodiment is not limited to the examples described below.

The production conditions and characterization items for the polyoxymethylene resin compositions and the molded articles thereof in Examples and Comparative Examples will be shown below.

[Polyoxymethylene Resin Composition and Production of Molded Article]

(1) Extrusion Processing of Polyoxymethylene Resin Composition

Method 1

A single-screw extruder (5532, manufactured by Sanki-Seisakusyo (L (effective screw length)/D (screw diameter)=48, with a vent) was used, and all of cylinder temperatures were set to 200° C. Thereafter, component (A), component (B), and, in some cases, component (C), and also additional components were mixed with one another all at once, and were then supplied through a quantitative feeder from the main throat portion of the extruder. A resin kneaded mixture was extruded in the form of a strand under conditions of an extruded amount of 15 kg/hour and a screw rotation speed of 150 rpm, and it was then quickly cooled in a strand bath. The resultant was cut using a strand cutter to obtain a pellet-shaped molded article.

Method 2

A twin-screw extruder (TEM-26SS extruder, manufactured by TOSHIBA MACHINE CO., LTD., L/D=48, with a vent) was used, and all of cylinder temperatures were set to 200° C. Thereafter, component (A), component (B), and, in some cases, component (C), and also additional components were mixed with one another all at once, and were then supplied through a quantitative feeder from the main throat portion of the extruder. A resin kneaded mixture was extruded in the form of a strand under conditions of an extruded amount of 15 kg/hour and a screw rotation speed of 150 rpm, and it was then quickly cooled in a strand bath. The resultant was cut using a strand cutter to obtain a pellet-shaped molded article.

Method 3

A twin-screw extruder (TEM-26SS extruder, manufactured by TOSHIBA MACHINE CO., LTD., L/D=48, with a vent) was used, and all of cylinder temperatures were set to 200° C. Thereafter, pellets equivalent to 90 phr of component (A), and powder equivalent to 10 phr of component (A) were respectively supplied alone through a quantitative feeder from the main throat portion of the extruder. Further, component (B), and, in some cases, component (C), and also additional components were mixed with one another all at once, and were then supplied through a quantitative feeder from the main throat portion of the extruder. A resin kneaded mixture was extruded in the form of a strand under conditions of an extruded amount of 15 kg/hour and a screw rotation speed of 150 rpm, and it was then quickly cooled in a strand bath. The resultant was cut using a strand cutter to obtain a pellet-shaped molded article.

(2) Molding Processing (Production of Multi-Purpose Test Piece-Shaped Molded Article Using Injection Molding Machine)

An injection molding machine (EC-75NII, manufactured by TOSHIBA MACHINE CO., LTD.) was used, and the cylinder temperature was set to 205° C. Molding was carried out under injection conditions of an injection time of 35 seconds and a cooling time of 15 seconds to obtain a multi-purpose test piece-shaped molded article that was in accordance with ISO294-1. Mold temperature at this time was set to 80° C.

Molding was carried out 10 cycles, and the time required for each cycle was measured. The difference between the shortest and the longest of the time in one cycle was calculated to evaluate the moldability. It was decided that the smaller the numerical value, the more excellent the moldability.

AAA: The error of the molding cycle time is within 0.05 seconds.
AA: The error of the molding cycle time is within 0.1 seconds.
A: The error of the molding cycle time is within 0.2 seconds.
BBB: The error of the molding cycle time is within 0.5 seconds.
BB: The error of the molding cycle time is within 1.0 seconds.
B: The error of the molding cycle time is within 1.5 seconds.
CCC: The error of the molding cycle time is within 2.0 seconds.
CC: The error of the molding cycle time is within 10 seconds.
C: The error of the molding cycle time is within 20 seconds.
Molding failure: The error of the molding cycle time is within 60 seconds.

(3) Cleaning of Molded Article

To remove the substances adhering to the surface layer of the molded article obtained in (2) above, ultrasonic cleaning under a condition of 50° C. for 3 minutes was performed using an 1.5% aqueous solution of a commercially available cleaning agent (VALTRON DP97031®) for precision equipment, so that organic substances were removed from the surface. Thereafter, an ultrasonic treatment was carried out using distilled water for high performance liquid chromatography under a condition of room temperature for 15 minutes.

Subsequently, the cleaned sample was subjected to a drying treatment in a drying oven at 80° C. for 1 hour to obtain a molded article of the polyoxymethylene resin composition for measurement (Multi-Purpose Test Piece-Shaped Molded article).

[Surface Characterization]

(1) Sliding Agent Dispersibility (Surface Characteristic 1)

An ultra-thin sliced piece having a thickness of about 100 nm of a plane parallel to the resin flow direction near the surface of the molded article was prepared from the multi-purpose test piece obtained by (2) Molding Processing (Production of Multi-Purpose Test Piece-Shaped Molded Article Using Injection Molding Machine) in [Polyoxymethylene Resin Composition and Production of Molded Article] described above using a cryo ultramicrotome. The sliced piece was subjected to staining with a dye. The resulting stained piece was observed using a transmission electron microscope (H-7650, manufactured by Hitachi, Ltd.) at an accelerating voltage of 120 kV. Minor diameters and major diameters of each of the dispersed domains of the sliding agent (B) which were identified during the observation were measured, and taken the mean values of each of the measured minor diameters and major diameters.

In the item "surface layer 1", the number of dispersion domains present in a region of 1000 nm in depth from a surface of the molded article and 12000 nm in width was described.

In the item "surface layer 2", the number of dispersion domains present in a region of 500 nm in depth from a surface of the molded article and 12000 nm in width was described.

In the item "major diameter", the arithmetic mean value of the measured major diameters of all dispersion domains identified in "surface layer 1" was described.

In the item "minor diameter", the arithmetic mean value of the measured minor diameters of all dispersion domains identified in "surface layer 1" was described.

A TEM image (sectional view) of the below-mentioned Example 2 is shown in FIG. 1 and a TEM image (sectional view) of Comparative Example 4 is shown in FIG. 2. In the Figures, arrows in the vertical direction of at left and right sides indicate the distances of 500 nm and 1000 nm, respectively.

(2) Relative Element Concentration Ratio [C/O] (Surface Characteristic 2)

The relative element concentration ratio [C/O] (atomic %) between carbon and oxygen in the surface of the multi-purpose test piece obtained by (2) Molding Processing (Production of Multi-Purpose Test Piece-Shaped Molded Article Using Injection Molding Machine) in [Polyoxymethylene Resin Composition and Production of Molded Article] and (3) Cleaning of the Molded Article in [Polyoxymethylene Resin Composition and Production of Molded Article] described above was measured as follows.

ESCALAB250 manufactured by Fisher Scientific K.K. was used as the measuring equipment, and monoAlKα (15 kV×10 mA) was used as an excitation source. Upon the measurement, a sample was cut into a size of approximately 1 mm (in elliptical shape), and then, in order to remove substances adhering to the surface layer of the molded article, ultrasonic cleaning under a condition of 50° C. for 3 minutes was performed using an 1.5% aqueous solution of a commercially available cleaning agent (VALTRON DP97031) for precision equipment, so that organic substances were removed from the surface. Thereafter, an ultrasonic treatment was carried out using distilled water for high performance liquid chromatography under a condition of room temperature for 15 minutes, so that the sample was cleaned. Subsequently, the cleaned sample was subjected to a drying treatment in a drying oven at 80° C. for 1 hour, and then subjected to measurement. In this measurement, the photoelectron acceptance angle was set to 0° (the axis of a spectrometer was vertical to the surface of the sample), and the uptake region was set to a region of 0 to 1100 eV in Survey scan and of C 1s, O 1s and N 1s in Narrow scan. Moreover, Pass Energy was carried out at 100 eV in Survey scan and at 20 eV in Narrow scan. During this operation, C concentration was defined as a peak area ratio of the peak top range of 284 to 288 eV, and the O concentration was defined as a peak area ratio of the peak top range of 530 to 536 eV. A relative element concentration was calculated from each of the peak area ratios, and the obtained value was rounded off as a two-digit significant figure when the concentration is 1 atomic % or more, and as a one-digit significant figure when the concentration is less than 1 atomic %. The ratio between each of the element concentrations was defined as a "relative element concentration ratio between carbon and oxygen in the surface."

(3) Peak Intensity Ratio (P/Q) (Surface Characteristic 3)

The peak intensity ratio (P/Q) of peak intensity P derived from C—O stretching vibration to peak intensity Q derived from C=O stretching vibration of each of the multi-purpose test piece-shaped molded article surfaces obtained by (2) Molding Processing (Production of Multi-Purpose Test Piece-Shaped Molded Article Using Injection Molding Machine) in [Polyoxymethylene Resin Composition and Production of Molded Article] and (3) Cleaning of the Molded Article in [Polyoxymethylene Resin Composition and Production of Molded Article] described above was measured by infrared spectroscopy as described below.

Spectrum One, manufactured by PerkinElmer Co., Ltd., was used as measuring equipment, and the peak intensity ratio (P/Q) was measured by an ATR method (crystals: diamond/ZnSe). The measurement range was set to the range of 500 $cm^{-1}$ to 4000 $cm^{-1}$, wave number resolution was set to 4 $cm^{-1}$, and the cumulated number was set to 16. During the measurement, C—O (derived from the repeating structure of polyoxymethylene) signal was calculated as peak intensity (peak height) at 1090 $cm^{-1}$, and C=O signal was calculated as peak intensity from 1600 $cm^{-1}$ to 1750 $cm^{-1}$. Then, the "peak intensity ratio (P/Q) of peak intensity P derived from C—O stretching vibration to peak intensity Q derived from C=O stretching vibration in the surface of the molded article" was calculated. In the peak intensity calculation, linear baselines were drawn from 1040 $cm^{-1}$ to 1160 $cm^{-1}$ and from 1590 $cm^{-1}$ to 1760 $cm^{-1}$, and a positive peak height from the baseline was read out as peak intensity.

[Characterization]

(1) Sliding Test Under High Load (Sliding Test 1)

Using a ball-on-disk-type reciprocating motion friction wear testing machine (AFT-15MS, manufactured by TOYO PRECISION PARTS MFG. CO., LTD.), a multi-purpose test piece-shaped molded article was subjected to a sliding test in an environment of a temperature of 23° C. and a humidity of 50%, under conditions of a load of 19.6 N, a linear velocity of 30 mm/sec, a round-trip distance of 20 mm, and the number of round-trips of 10,000. As a ball material, SUS 304 ball (a sphere having a diameter of 5 mm) was used.

(2) Sliding Tests Under Very Low Load (Sliding Tests 2 to 5)

Using a ball-on-disk-type friction wear testing machine (Nano tribometer 2 ®, TTX-NTR2, manufactured by CSM Instruments), a multi-purpose test piece-shaped molded article, which had been obtained by (3) in [Polyoxymethylene Resin Composition and Production of Molded Article] described above was subjected to sliding tests under conditions of a load of 0.1 N, a sliding velocity of 200 mm/sec, a round-trip distance of 10,000 μm, and the number of round-trips of 1,200,000.

As a ball material, SUJ2 ball (a sphere having a diameter of 1.5 mm) was used.

Each of the sliding tests were performed in the following test environments: (Sliding Test 2) temperature of 23° C. and humidity of 50%; (Sliding Test 3) temperature of 70° C. and humidity of 50%; (Sliding Test 4) temperature of −5° C. and a humidity of 50%; (Sliding Test 5) temperature of −30° C. and humidity of 10%.

(3) Evaluation Method of Wear Resistance Characteristic

The wear loss (wear depth) of the molded article after completion of (1) Sliding Test under High Load (Sliding Test 1) in [Characterization] described above was measured using a confocal microscope (OPTELICS® H1200, manufactured by Lasertec Corporation).

The wear depth was defined as a mean value of numerical values measured at n=4, and was rounded off the first decimal point. Measurement was performed at points equidistant intervals of 4000 μm from the end of the wear scar. It was evaluated the smaller the numerical value of the wear depth, the more excellent wear characteristics that could be obtained.

The wear loss (wear cross-sectional area) of the molded article after completion of (2) Sliding Tests under Very Low Load (Sliding Tests 2 to 5) in [Characterization] described above were also measured using a confocal microscope (OPTELICS® H1200, manufactured by Lasertec Corporation). The wear sectional area was defined as a mean value of numerical values measured at n=4, and was rounded off the first decimal point. Measurements were performed at points equidistant intervals of 2000 μm from the end of the wear scar. It was evaluated that the smaller the numerical value of the wear cross-sectional area, the more excellent wear characteristics.

(4) Odor Property (Characteristic 1)

During the operation (1) in [Polyoxymethylene Resin Composition and Production of Molded Article], 1 kg of the pellet just after cutting with a strand cutter was collected into the paper bag having a 50 cm long and 25 cm width, and the odor property thereof was evaluated by five people.

The determination value was defined as a mean value of the determinations of the five people, and was rounded off at the first decimal point.

The determination criteria were as follows. It was decided that the smaller the numerical value, the more excellent the odor property.

S: No smell was felt.
A: A little smell was felt.
B: A smell was felt.
C: A strong smell was felt.
D: A pretty strong smell was felt.

(5) Extrusion Production Stability (Characteristic 2)

During the operation (1) in [Polyoxymethylene Resin Composition and Production of Molded Article], the stability of the strand just after the die portion of the extruder was determined.

The determination value was defined as the mean value of the values obtained by the visual determination of 1 minute at n=5, and was rounded off at the first decimal point. The determination criteria were as follows. It was decided that the smaller the numerical value, the more excellent the extrusion production stability.

S: No die drool was observed, and there was no breakage.
A: Slight drools were observed.
B: Slight drools were observed and there was a little breakage.
C: There was some breakage, and the thickness of the strand was varied over time.
D: There were a lot of drools, and repeated breakages.

(6) Surface Smoothness (Characteristic 3)

Three molded articles obtained by performing (2) Molding Processing (Production of Multi-Purpose Test Piece-Shaped Molded Article Using Injection Molding Machine) in [Polyoxymethylene Resin Composition and Production of Molded Article] described above were visually examined and determined by five people.

The determination value was defined as a mean value of the evaluations of the five people, and was rounded off at the first decimal point.

The determination criteria were as follows.

It was decided that the smaller the numerical value, the more excellent the surface smoothness.

S: No unevenness can be observed.
A: Slight unevenness can be observed.
B: Some unevenness can be observed.
C: Significant unevenness can be observed.
D: Very significant unevenness can be observed.

(7) Color Difference Before and after Aging (Characteristic 4)

The pellet-shaped polyoxymethylene resin molded articles obtained by performing (1) Extrusion Processing of Polyoxymethylene Resin Composition in [Polyoxymethylene Resin Composition and Production of Molded Article] described above were placed in an oven set to 145° C., and subjected to an aging treatment for 48 hours. The color tone of the obtained pellets was compared to the color tone of the pellets before drying, and the color difference was determined. Determination was conducted by five people with visual observation. According to the color difference before and after aging, the presence/absence of the discoloration was examined, and further, for pellets with discoloration, the degree of color change was evaluated according to the following criteria. It was decided that the smaller the numerical value, the more excellent the color difference before and after aging.

S: No discoloration was observed.
A: Slightly yellow discoloration was observed.
B: Dark yellowish discoloration was observed.
C: Light brown discoloration was observed.
D: Dark brown discoloration was observed.

(8) Peeling Property (Characteristic 5)

Using an injection molding machine (EC-75NII, manufactured by TOSHIBA MACHINE CO., LTD.) and setting the cylinder temperature at 205° C., molding was carried out under injection conditions of an injection time of 35 seconds and a cooling time of 15 seconds to obtain a gear molding of gear ϕ60. The mold temperature at this time was set to 80° C. The three obtained gear molded articles were cut into a grid (1 mm spacing) with a cutter in a gate portion and a weld portion, and the resultant molded articles were subjected to a peeling test using a cellophane tape. The determination value was defined as a mean value of the measured values at n=3, and was rounded off at the first decimal point. The determination criteria were as follows. It was decided that the smaller the numerical value, the more excellent the peeling property.

S: No peeling was observed.
A: Slight peeling of about 10% or less of the total was observed.
B: 40% or less of the total was peeled.
C: 70% or more of the total was peeled.
D: 90% or more of the total was peeled.

(9) Outgassing Property (Characteristic 6)

The pellet-shaped polyoxymethylene resin molded articles obtained by performing (1) Extrusion Processing of Polyoxymethylene Resin Composition in [Polyoxymethylene Resin Composition and Production of Molded Article] described above were dried at 80° C. for 3 hours using a hot air dryer. 0.5 g of the dried pellet-shaped polyoxymethylene resin molded article was heated to 90° C. in helium gas, then the helium gas was purged at 50 ml/min, and the generated gas was adsorbed to an adsorption tube for 180 minutes. Next, this adsorption tube was set in GC-MS (manufactured by Hewlett-Packard Company, GC-5890, MSD-5972A) to desorb gas using a non-polar column, and the amount of outgas was measured using hexadecane as a reference material. The amount of each component having a retention time of 1 to 25 minutes was calculated in terms of hexadecane as per 1.0 g of the molded article (μg/g). It was decided that the smaller the numerical value, the more excellent outgassing property.

(10) Bleed Out Test (Characteristic 7)

The multi-purpose test piece-shaped molded article obtained by (2) Molding Processing (Production of Multi-Purpose Test Piece-Shaped Molded Article Using Injection Molding Machine) described above at a mold temperature of 80° C. was exposed for a week in a thermo-hygrostat (Platinous Rainbow PR-2KTH, manufactured by Tabai Espec Corporation) in which the temperature was set to 85° C. and the humidity was set to 85%. After completion of the exposure, the surface of the resultant molded article was evaluated using a confocal microscope (OPTELICS® H1200, manufactured by Lasertec Corporation). In this evaluation, the number of precipitates in a visual field of 0.15 mm×0.15 mm was counted, and the obtained value was converted to the number in a unit area (1 mm$^2$) for comparison. It was decided that the smaller the numerical value, the more excellent the bleed out performance.

S: Bleed out was not observed.
A: The number of bleed out precipitate was 0 to 10.
B: The number of bleed out precipitate was 10 to 100.
C: The number of bleed out precipitate was 100 to 200.
D: The number of bleed out precipitate was 200 or more.

[(A) Production of Polyoxymethylene Resin]

(A1) Polyoxymethylene Copolymer

A polyoxymethylene copolymer was prepared as follows.

A twin-screw self-cleaning-type polymerizer with a jacket capable of giving a passage to a heating medium (L/D=8 (L: distance (m) from the raw material supplying port of the polymerizer to the discharge port thereof; D: the internal diameter (m) of the polymerizer) was adjusted to 80° C. To the polymerizer, 4 kg/hour of trioxane, 200 g/hour of 1,3-dioxolane used as a comonomer, and methylal used as a chain transfer agent, in an amount of $0.25 \times 10^{-3}$ mole based on 1 mole of trioxane, were continuously added. Moreover, to the polymerizer, boron trifluoride di-n-butyletherate used as a polymerization catalyst, in an amount of $1.5 \times 10^{-5}$ moles based on 1 mole of trioxane, was continuously added, and polymerization was carried out. A polyoxymethylene copolymer discharged from the polymerizer was poured into an aqueous solution of 0.1% triethylamine, so that the polymerization catalyst was inactivated. The thus inactivated polyoxymethylene copolymer was filtrated using a centrifuge.

Thereafter, 1 part by mass of an aqueous solution comprising a quaternary ammonium compound was added to 100 parts by mass of the polyoxymethylene copolymer, and they were homogeneously mixed. Thereafter, the obtained mixture was supplied to a vented twin-screw extruder, and 0.5 parts by mass of water was then added to 100 parts by mass of the polyoxymethylene copolymer melted in the extruder, so that an unstable terminal portion of the polyoxymethylene copolymer was decomposed and removed at an extruder preset temperature of 200° C. and a retention time in the extruder of 7 minutes. During this operation, the amount of the quaternary ammonium compound added was set to 20 ppm by mass in terms of the amount of nitrogen. Thereafter, 0.3 parts by mass of triethylene glycol-bis-[3-(3-t-butyl-5-methyl-4-hydroxyphenyl)-propionate] was added as an antioxidant to the polyoxymethylene copolymer, the unstable terminal portion of which had been decomposed, and the obtained mixture was then extruded as a strand from the die portion of the vented extruder, while devolatilization was performed under conditions of a vacuum degree of 20 Torr. Thereafter, the strand was pelletized. The thus obtained polyoxymethylene copolymer was defined as a polyoxymethylene resin (A1). The melt flow rate of the polyoxymethylene resin (A1) was 9 g/10 minutes (ISO-1133 condition D). The SP value of this polyoxymethylene resin (A1) calculated by the Fedors method was 9.95 $((cal/cm^3)^{1/2})$.

(A2) Polyoxymethylene Block Copolymer 1

A twin-screw puddle-type continuous polymerizer with a jacket capable of giving a passage to a heating medium was adjusted to 80° C. 40 moles/hour of trioxane, 2 moles/hour of 1,3-dioxolane used as cyclic formal, boron trifluoride di-n-butyletherate dissolved in cyclohexane, used as a polymerization catalyst, in an amount of $5\times10^{-5}$ moles based on 1 mole of trioxane, and hydrogenated polybutadiene having hydroxyl groups at both ends (having number average molecular weight of 2330) represented by the following formula (11), used as a chain transfer agent, in an amount of $1\times10^{-3}$ moles based on 1 mole of trioxane, were continuously supplied to the polymerizer, and polymerization was carried out.

(11)

Subsequently, a polymer discharged from the above described polymerizer was poured into an aqueous solution of 1% triethylamine, so that the polymerization catalyst was completely inactivated. Thereafter, the polymer was filtrated and washed to obtain a crude polyoxymethylene block copolymer. 1 part by mass of an aqueous solution comprising a quaternary ammonium compound was added to 100 parts by mass of the crude polyoxymethylene block copolymer, and they were homogeneously mixed. Thereafter, the obtained mixture was supplied to a vented twin-screw extruder, and 0.5 parts by mass of water was then added to 100 parts by mass of the polyoxymethylene block copolymer melted in the extruder, so that an unstable terminal portion of the polyoxymethylene block copolymer was decomposed and removed at an extruder preset temperature of 200° C. and a retention time in the extruder of 7 minutes. During this operation, the amount of the quaternary ammonium compound added was set to 20 ppm by mass in terms of the amount of nitrogen. Thereafter, 0.3 parts by mass of triethylene glycol-bis-[3-(3-t-butyl-5-methyl-4-hydroxyphenyl)propionate] was added as an antioxidant to the polyoxymethylene block copolymer, the unstable terminal portion of which had been decomposed, and the obtained mixture was then extruded as a strand from the die portion of the vented extruder, while devolatilization was performed under conditions of a vacuum degree of 20 Torr. Thereafter, the strand was pelletized. The thus obtained polyoxymethylene block copolymer was defined as a polyoxymethylene block copolymer 1 (A2). This block copolymer was an ABA-type block copolymer, and had a melt flow rate of 10.0 g/10 minutes (ISO-1133 condition D). The SP value of this polyoxymethylene resin (A2) calculated by the Fedors method was 9.95 $((cal/cm^3)^{1/2})$, and the SP value of the block portion was 8.20 $((cal/cm^3)^{1/2})$.

(A3) Polyoxymethylene Block Copolymer 2

First, sufficiently dehydrated and dried paraformaldehyde was thermally decomposed at 150° C., and passed through a cold trap several times to obtain formaldehyde gas with a purity of 99.9%. The formaldehyde gas, and a toluene solution of 2,6-di-t-butyl-p-cresol-added $C_{18}H_{37}O(CH_2CH_2O)_{70}H$ (ethylene oxide adduct of stearyl alcohol) and tetrabutylammonium acetate used as a catalyst were respectively and simultaneously supplied to the polymerizer continuously for three hours, to produce a polymer. The polymerization temperature during this operation was kept at 60° C. The feed rate of the formaldehyde gas was set to 110 parts by mass per hour, and the feed rates of a toluene solution of a trace of 2,6-di-t-butyl-p-cresol-added $C_{18}H_{37}O(CH_2CH_2O)_{70}H$ (ethylene oxide adduct of stearyl alcohol) and tetrabutylammonium acetate was set to 500 parts by mass per hour. The concentration of the tetrabutylammonium acetate in toluene was set to $1.0\times10^{-4}$ mol/L, and the concentration of the 2,6-di-t-butyl-p-cresol-added $C_{18}H_{37}O(CH_2CH_2O)_{70}H$ in the solution was set to $5.0\times10^{-3}$ mol/L. The toluene solution comprising the resulting polymer was continuously withdrawn in an amount commensurate with a supply amount, and then the polymer was separated from toluene by filtration. The polymer after filtration was washed thoroughly with acetone, then was vacuum dried at 60° C. to obtain 289 parts by mass of a white polymer. 50 parts by mass of the thus obtained polymer was mixed with 500 parts by mass of acetic anhydride and 0.1 parts by mass of potassium acetate, and the mixture was heated for 3 hours at 139° C., and cooled. Then, the polymer was thoroughly washed with acetone in the same manner as described above, then dried as well to recover 49 parts by mass of a linear polyoxymethylene polymer. To 100 parts by mass of the recovered polymer, 0.5 parts by mass of triethylene glycol-bis-(3-(3-t-butyl-5-methyl-4-hydroxyphenyl)-propionate) (Ciba-Geigy Inc., trade name "IRGANOX245") which is a hindered phenolic antioxidant, and 0.5 parts by mass of poly-β-alanine were added and mixed. The obtained mixture was melt-kneaded in a vented single-screw extruder to obtain a polymer composition. The melt flow rate of the resulting polymer composition was 17.0 g/10 min (in accordance with ISO 1133 D), and the number-average molecular weight thereof measured by GPC was 67000. The SP value of this polyoxymethylene resin (A3) calculated by the Fedors method was 9.98 $((cal/cm^3)^{1/2})$, and the SP value of the block portion was 9.31 $((cal/cm^3)^{1/2})$.

(A4) Polyoxymethylene Block Copolymer 3

A polyoxymethylene block copolymer was obtained totally in the same manner as in the production example of polyoxymethylene block copolymer 1 (A2), with the exception that the block portion, added as a chain transfer agent, was changed to polypropylene glycol having a number average molecular weight of 2470. The thus obtained polyoxymethylene block copolymer was defined as a polyoxymethylene block copolymer 3 (A4). This block copolymer was an ABA-type block copolymer, and had a melt flow rate of 11.0 g/10 minutes (ISO-1133 condition D). The SP value of this polyoxymethylene resin (A4) calculated by the Fedors method was 9.95 ((cal/cm$^3$)$^{1/2}$), and the SP value of the block portion was 8.98 ((cal/cm$^3$)$^{1/2}$).

(A5) Polyoxymethylene Block Copolymer 4

A polyoxymethylene block copolymer was obtained totally in the same manner as in the production example of polyoxymethylene block copolymer 1 (A2), with the exception that the block portion, added as a chain transfer agent, was changed to 1,6-hexanediol diglycidyl ether (having molecular weight of 230). The thus obtained polyoxymethylene block copolymer was defined as a polyoxymethylene block copolymer 3 (A5). This block copolymer had a melt flow rate of 9.0 g/10 minutes (ISO-1133 condition D). The SP value of this polyoxymethylene resin (A5) calculated by the Fedors method was 9.95 ((cal/cm$^3$)$^{1/2}$), and the SP value of the block portion was 12.53 ((cal/cm$^3$)$^{1/2}$).

(A6) Polyoxymethylene Block Copolymer 5

A polyoxymethylene block copolymer was obtained totally in the same manner as in the production example of polyoxymethylene block copolymer 1 (A2), with the exception that the block portion, added as a chain transfer agent, was changed to 2,2-bis(4-hydroxyphenyl)propane diglycidyl ether (having molecular weight of 228). The thus obtained polyoxymethylene block copolymer was defined as a polyoxymethylene block copolymer 5 (A6). This block copolymer had a melt flow rate of 9.0 g/10 minutes (ISO-1133 condition D). The SP value of this polyoxymethylene resin (A6) calculated by the Fedors method was 9.95 ((cal/cm$^3$)$^{1/2}$) and the SP value of the block portion was 14.75 ((cal/cm$^3$)$^{1/2}$).

(A7) Polyoxymethylene Block Copolymer 6

A polyoxymethylene block copolymer was obtained totally in the same manner as in the production example of polyoxymethylene block copolymer 1 (A2), with the exception that the block portion, added as a chain transfer agent, was changed to trimethylolpropane triglycidyl ether (having a molecular weight of 302). The thus obtained polyoxymethylene block copolymer was defined as a polyoxymethylene block copolymer 6 (A6). This block copolymer had a melt flow rate of 9.0 g/10 minutes (ISO-1133 condition D). The SP value of this polyoxymethylene resin (A7) calculated by the Fedors method was 9.95 ((cal/cm$^3$)$^{1/2}$), and the SP value of the block portion was 15.80 ((cal/cm$^3$)$^{1/2}$).

(A8) Polyoxymethylene Block Copolymer 7

A polyoxymethylene block copolymer was obtained totally in the same manner as in the production example of polyoxymethylene block copolymer 1 (A2), with the exception that the block portion, added as a chain transfer agent, was changed to pentaerythritol tetraglycidyl ether (having a molecular weight of 360). The thus obtained polyoxymethylene block copolymer was defined as a polyoxymethylene block copolymer 7 (A6). This block copolymer had a melt flow rate of 9.0 g/10 minutes (ISO-1133 condition D). The SP value of this polyoxymethylene resin (A8) calculated by the Fedors method was 9.95 ((cal/cm$^3$)$^{1/2}$), and the SP value of the block portion was 17.14 ((cal/cm$^3$)$^{1/2}$).

[(B) Sliding Agent]

The sliding agent shown in the following [Table 1] were used. B7 in the following [Table 1] was obtained by thermal decomposition of a commercially available polypropylene under oxygen atmosphere. B10 and B17 were obtained by thermal decomposition of a commercially available polyethylene under oxygen atmosphere. B5 in the following [Table 1] was obtained with reference to the method of "Example 1" described in Japanese Patent Laid-Open No. 62-167308. The acid-modified polyolefins B1, B6, B8, B9, B13, B14, B15, and B16 in the following [Table 1] were prepared with reference to "Example 1 or 2" described in Japanese Patent Laid-Open No. 2004-75749, so that they have physical properties shown in Table 1. The polyolefin B11 and B12 in the following [Table 1] were prepared with reference to "Synthesis Example 1" described in Japanese Patent Laid-Open No. 2004-75749, so that they have physical properties shown in Table 1. B5 in the following [Table 1] was purchased commercially, and used.

TABLE 1

| | Name | Content of ethylene unit (mol %) | Content of propylene unit (mol %) | Oxidation method | Reaction time (hour) | Acid value (mg-KOH/g) | Weight average molecular weight (Mw) | Molecular weight distribution | Melting point (° C.) | Melt viscosity at 140° C. (mPa · s) | Melt viscosity at 180° C. (mPa · s) |
|---|---|---|---|---|---|---|---|---|---|---|---|
| B1 | Acid-modified polyolefin 1 | 95.1 | 4.9 | Air oxidation | 6.0 | 60 | 1500 | 2.4 | 104 | 150 | — |
| B5 | Acid-modified polyolefin 2 | — | — | Modification with maleic acid | — | 85 | — | — | — | — | — |
| B6 | Acid-modified polyolefin 3 | 94.7 | 5.3 | Air oxidation | 6.0 | 63 | 1010 | 1.2 | 110 | 100 | — |
| B7 | Acid-modified polyolefin 4 | 3.4 | 96.6 | Thermal decomposition | — | 45 | 18000 | 2.9 | 129 | 2500 | 129 |
| B8 | Acid-modified polyolefin 5 | 95.7 | 4.3 | Air oxidation | 1 | 14 | 2800 | 1.5 | 89 | 70 | — |
| B9 | Acid-modified polyolefin 6 | 96.4 | 3.6 | Air oxidation | 2 | 14 | 1700 | 1.5 | 89 | 70 | — |
| B10 | Acid-modified polyolefin 7 | 95.7 | 4.3 | Thermal decomposition | — | 17 | 16000 | 8.9 | 110 | 400 | — |
| B11 | Polyolefin 8 | 94.8 | 5.2 | — | — | 0 | 1000 | 1.3 | 87 | 100 | — |
| B12 | Polyolefin 9 | 94.8 | 5.2 | — | — | 0 | 10000 | 2 | 89 | 800 | — |
| B13 | Acid-modified polyolefin 10 | 95.5 | 4.5 | Air oxidation | 6.0 | 82 | 600 | 1.1 | 110 | 50 | — |
| B14 | Acid-modified polyolefin 11 | 96.3 | 3.7 | Air oxidation | 7 | 80 | 20000 | 2.8 | 130 | 1100 | 140 |
| B15 | Acid-modified polyolefin 12 | 96.1 | 3.9 | Air oxidation | 3 | 30 | 2700 | 5.5 | 95 | 2500 | — |

TABLE 1-continued

| Name | | Content of ethylene unit (mol %) | Content of propylene unit (mol %) | Oxidation method | Reaction time (hour) | Acid value (mg-KOH/g) | Weight average molecular weight (Mw) | Molecular weight distribution | Melting point (° C.) | Melt viscosity at 140° C. (mPa·s) | Melt viscosity at 180° C. (mPa·s) |
|---|---|---|---|---|---|---|---|---|---|---|---|
| B16 | Acid-modified polyolefin 13 | 96.3 | 3.7 | Air oxidation | 5.0 | 37 | 3000 | 2.3 | 110 | 50 | — |
| B17 | Acid-modified polyolefin 14 | 96.2 | 3.8 | Thermal decomposition | 1 | 20 | 70000 | 4.5 | 140 | 3000 | 140 |

The compounds used as components (B2), (B3) and (B4) were as follows:
(B2) Ethylene Glycol Distearate
weight average molecular weight: 623, manufactured by HOKKO CHEMICALS Co., Ltd., melting point: 65° C.;
(B3) Ethylenebis Stearic Acid Amide weight average molecular weight: 593, manufactured by HOKKO CHEMICALS Co., Ltd., melting point: 145° C.,
(B4) Polyolefin
L1850A, manufactured by Asahi Kasei Corporation, melting point: 107° C., 6.7 g/10 min (JIS K 7210).
In the present Examples, weight average molecular weight of the component (B) was determined by liquid chromatography/mass spectrometry when the weight average molecular weight of the component (B) was 1000 or less, and was determined by gel permeation chromatography when the weight average molecular weight of the component (B) was more than 1000. The melting point of component (B) was measured by the DSC method in accordance with JIS K 7121. Further, the melt viscosity was measured by melt mass flow rate in accordance with JIS K 7210.
[(C) Coloring Agent]
(C1) zinc sulfide: Mohs hardness of 4
(C2) zinc oxide: Mohs hardness of 5
(C3) zinc-iron composite oxide: Mohs hardness of 5
(C4) iron oxide: Mohs hardness of 6
(C5) titanium dioxide: Mohs hardness of 7

In the present embodiment, Mohs hardness was measured by a Mohs hardness tester.

Examples and Comparative Examples

Each of the components were mixed in the ratio described in the following [Table 2] to [Table 6], and the obtained mixture was subjected to evaluations for various properties. For Examples 1 to 8, difference between SP values of a block portion of the polyoxymethylene resin of the sliding agent (B) was calculated, where the SP values was calculated by the Fedors method. In Comparative Example 13, the resulting pelletized molded article was thermally pressed at 200° C. to obtain a multi-purpose test piece. In the observation of this multi-purpose test piece, component (B) was bled out on the surface of test piece, and dispersion of this component could not be observed inside of the molded article. Comparative Examples 1, 2, 5, and 7 could not be evaluated due to the extrusion failure. In Comparative Example 8, the resulting pelletized molded article was thermally pressed at 200° C. to obtain a multi-purpose test piece. In the observation of this multi-purpose test piece, component (B) was bled out on the surface of test piece, and dispersion of this component could not be observed inside of the molded article.

TABLE 2

| | | Unit | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Polyoxymethylene resin | A1 | phr | — | — | — | — | — | — | — | — | 10 | 30 |
| | A2 | phr | 100 | 100 | — | — | — | — | — | — | 90 | 70 |
| | A3 | phr | — | — | 100 | — | — | — | — | — | — | — |
| | A4 | phr | — | — | — | 100 | — | — | — | — | — | — |
| | A5 | phr | — | — | — | — | 100 | — | — | — | — | — |
| | A6 | phr | — | — | — | — | — | 100 | — | — | — | — |
| | A7 | phr | — | — | — | — | — | — | 100 | — | — | — |
| | A8 | phr | — | — | — | — | — | — | — | 100 | — | — |
| Sliding agent | B1 | phr | 2 | 2 | 2 | 2 | 2 | 2 | 2 | 2 | 2 | 2 |
| | Method 1 | [–] | — | — | — | — | — | — | — | — | — | — |
| | Method 2 | [–] | ● | — | — | — | — | — | — | — | — | — |
| | Method 3 | [–] | — | ● | ● | ● | ● | ● | ● | ● | ● | ● |
| | Moldability | [–] | AAA | AAA | A | AA | AA | A | A | A | AAA | AAA |
| Surface characteristic | Sliding agent dispersibility | Number of dispersion domain in surface layer 1 (1000 nm × 12000 nm) | (n) | 14 | 15 | 5 | 12 | 11 | 6 | 5 | 5 | 15 | 13 |
| | | Average minor diameter | (nm) | 100 | 100 | 200 | 100 | 100 | 200 | 200 | 200 | 100 | 100 |
| | | Average major diameter | (nm) | 1200 | 1200 | 2000 | 1200 | 1500 | 2000 | 2000 | 2000 | 1200 | 1200 |

TABLE 2-continued

| | | Unit | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| | Number of dispersion domain in surface layer 2 (500 nm × 12000 nm) | (n) | 8 | 9 | 3 | 7 | 6 | 3 | 3 | 3 | 9 | 8 |
| | Relative element concentration ratio [C/O] | [—] | 1.21 | 1.21 | 1.85 | 1.32 | 1.25 | 1.28 | 1.24 | 1.23 | 1.20 | 1.25 |
| | Peak intensity ratio (C—O/C=O) | [—] | 221 | 215 | 380 | 480 | 520 | 530 | 540 | 580 | 245 | 286 |
| Wear resistance characteristic | High load | (μm) | 4 | 4 | 2 | 15 | 18 | 21 | 24 | 15 | 4 | 4 |
| | Very low load 70° C. | (μm$^2$) | 4 | 4 | 13 | 8 | 9 | 12 | 9 | 11 | 4 | 4 |
| | 23° C. | (μm$^2$) | 9 | 9 | 25 | 10 | 12 | 15 | 11 | 12 | 9 | 8 |
| | 0° C. | (μm$^2$) | 8 | 7 | 35 | 15 | 18 | 19 | 14 | 15 | 7 | 6 |
| | −5° C. | (μm$^2$) | 11 | 10 | 45 | 18 | 24 | 26 | 18 | 16 | 8 | 7 |
| | −30° C. | (μm$^2$) | 15 | 12 | 55 | 22 | 35 | 42 | 36 | 24 | 12 | 12 |
| Other characteristics | Odor property | [—] | A | A | B | A | A | A | A | A | A | A |
| | Extrusion production stability | [—] | S | S | A | S | S | S | S | S | S | S |
| | Surface smoothness | [—] | S | S | B | S | S | S | S | S | S | S |
| | Color difference before and after aging | [—] | A | A | B | A | A | A | A | A | A | S |
| | Peeling property | [—] | S | S | B | A | A | A | A | A | S | S |
| | Outgassing property | [—] | 350 | 350 | 450 | 350 | 330 | 320 | 330 | 320 | 350 | 360 |
| | Bleed out test | [—] | S | S | A | S | S | S | S | S | S | S |
| | Difference between SP values of block portion and of sliding agent | [—] | −0.5 | −0.5 | 0.6 | 0.3 | 1.1 | 6.3 | 7.3 | 8.3 | — | — |

TABLE 3

| | | | Unit | Example 11 | Example 12 | Example 13 | Example 14 | Example 15 | Example 16 | Example 17 | Example 18 | Example 19 |
|---|---|---|---|---|---|---|---|---|---|---|---|---|---|
| Polyoxymethylene resin | A1 | | phr | 40 | 50 | 70 | 90 | 50 | 50 | 50 | 50 | 50 |
| | A2 | | phr | 60 | 50 | 30 | 10 | 50 | 50 | 50 | 50 | 50 |
| Sliding agent | B1 | | phr | 2 | 2 | 2 | 2 | 0.3 | 0.5 | 1 | 3 | 5 |
| | Method 1 | | [—] | — | — | — | — | — | — | — | — | — |
| | Method 2 | | [—] | — | — | — | — | — | — | — | — | — |
| | Method 3 | | [—] | ● | ● | ● | ● | ● | ● | ● | ● | ● |
| | Moldability | | [—] | AAA | AAA | AA | AA | AAA | AAA | AAA | AAA | AAA |
| Surface characteristic | Sliding agent dispersibility | Number of dispersion domain in surface layer 1 (1000 nm × 12000 nm) | (n) | 13 | 12 | 13 | 7 | 5 | 8 | 15 | 18 | 19 |
| | | Average minor diameter | (nm) | 100 | 100 | 150 | 200 | 100 | 100 | 100 | 100 | 100 |
| | | Average major diameter | (nm) | 1200 | 1200 | 1200 | 1200 | 1200 | 1200 | 1200 | 1200 | 1200 |
| | | Number of dispersion domain in surface layer 2 (500 nm × 12000 nm) | (n) | 8 | 7 | 6 | 5 | 2 | 4 | 8 | 9 | 11 |
| | Relative element concentration ratio [C/O] | | [—] | 1.31 | 1.21 | 1.40 | 2.00 | 1.20 | 1.20 | 1.24 | 1.23 | 1.22 |
| | Peak intensity ratio (C—O/C=O) | | [—] | 237 | 234 | 381 | 279 | 384 | 298 | 398 | 298 | 276 |
| Wear resistance characteristic | High load | | (μm) | 4 | 4 | 7 | 8 | 20 | 18 | 11 | 6 | 8 |
| | Very low load 70° C. | | (μm$^2$) | 4 | 4 | 7 | 9 | 13 | 10 | 8 | 5 | 7 |
| | 23° C. | | (μm$^2$) | 7 | 6 | 9 | 10 | 15 | 10 | 8 | 7 | 8 |
| | 0° C. | | (μm$^2$) | 6 | 4 | 8 | 9 | 16 | 12 | 8 | 15 | 20 |
| | −5° C. | | (μm$^2$) | 7 | 5 | 9 | 12 | 18 | 10 | 7 | 18 | 23 |
| | −30° C. | | (μm$^2$) | 11 | 24 | 15 | 22 | 25 | 20 | 15 | 18 | 24 |
| Other characteristics | Odor property | | [—] | A | A | A | A | A | A | A | A | A |
| | Extrusion production stability | | [—] | S | S | S | A | S | S | S | S | S |
| | Surface smoothness | | [—] | S | S | S | S | S | S | S | S | S |
| | Color difference before and after aging | | [—] | S | S | S | S | S | S | S | S | S |

TABLE 3-continued

|  | Unit | Example 11 | Example 12 | Example 13 | Example 14 | Example 15 | Example 16 | Example 17 | Example 18 | Example 19 |
|---|---|---|---|---|---|---|---|---|---|---|
| Peeling property | [—] | S | S | S | S | S | S | S | S | S |
| Outgassing property | [—] | 370 | 320 | 350 | 340 | 120 | 190 | 250 | 350 | 400 |
| Bleed out test | [—] | S | S | S | S | S | S | S | S | S |

TABLE 4

|  |  |  | Unit | Example 20 | Example 21 | Example 22 | Example 23 | Example 24 | Example 25 | Example 26 |
|---|---|---|---|---|---|---|---|---|---|---|
| Polyoxymethylene resin | A1 |  | phr | 50 | 50 | 50 | 50 | 50 | 70 | 70 |
|  | A2 |  | phr | 50 | 50 | 50 | 50 | 50 | 30 | 30 |
| Sliding agent | B6 |  | phr | 2 | — | — | — | — | — | — |
|  | B7 |  | phr | — | 2 | — | — | — | — | — |
|  | B8 |  | phr | — | — | 2 | — | — | — | — |
|  | B9 |  | phr | — | — | — | 2 | — | — | — |
|  | B10 |  | phr | — | — | — | — | 2 | — | — |
|  | B13 |  | phr | — | — | — | — | — | 2 | — |
|  | B14 |  | phr | — | — | — | — | — | — | 2 |
|  | B15 |  | phr | — | — | — | — | — | — | — |
|  | B16 |  | phr | — | — | — | — | — | — | — |
|  | B17 |  | phr | — | — | — | — | — | — | — |
|  | Method 1 |  | [—] | — | — | — | — | — | — | — |
|  | Method 2 |  | [—] | — | — | — | — | — | — | — |
|  | Method 3 |  | [—] | ● | ● | ● | ● | ● | ● | ● |
|  | Moldability |  | [—] | AAA | AAA | AAA | AAA | AAA | AA | AA |
| Surface characteristic | Sliding agent dispersibility | Number of dispersion domain in surface layer 1 (1000 nm × 12000 nm) | (n) | 11 | 8 | 7 | 11 | 6 | 14 | 8 |
|  |  | Average minor diameter | (nm) | 120 | 150 | 120 | 120 | 150 | 120 | 150 |
|  |  | Average major diameter | (nm) | 1000 | 2000 | 1500 | 1500 | 2000 | 800 | 2500 |
|  |  | Number of dispersion domain in surface layer 2 (500 nm × 12000 nm) | (n) | 8 | 4 | 5 | 8 | 4 | 9 | 4 |
|  | Relative element concentration ratio [C/O] |  | [—] | 1.15 | 2.15 | 1.25 | 1.23 | 1.35 | 1.34 | 1.62 |
|  | Peak intensity ratio (C—O/C=O) |  | [—] | 425 | 873 | 435 | 469 | 724 | 369 | 390 |
| Wear resistance characteristic | High load |  | (μm) | 11 | 8 | 10 | 9 | 10 | 13 | 13 |
|  | Very low load | 70° C. | (μm²) | 3 | 6 | 16 | 22 | 16 | 21 | 12 |
|  |  | 23° C. | (μm²) | 5 | 9 | 5 | 7 | 2 | 15 | 18 |
|  |  | 0° C. | (μm²) | 3 | 4 | 6 | 4 | 2 | 62 | 32 |
|  |  | −5° C. | (μm²) | 2 | 12 | 11 | 4 | 12 | 25 | 98 |
|  |  | −30° C. | (μm²) | 23 | 21 | 9 | 25 | 9 | 35 | 120 |
| Other characteristics | Odor property |  | [—] | A | A | A | A | S | D | B |
|  | Extrusion production stability |  | [—] | S | S | S | S | S | C | S |
|  | Surface smoothness |  | [—] | S | S | S | S | S | A | S |
|  | Color difference before and after aging |  | [—] | A | S | S | S | S | C | C |
|  | Peeling property |  | [—] | S | S | S | S | S | A | A |
|  | Outgassing property |  | [—] | 300 | 250 | 300 | 300 | 200 | 350 | 350 |
|  | Bleed out test |  | [—] | S | S | S | S | S | A | A |

|  |  |  | Unit | Example 27 | Example 28 | Example 29 |
|---|---|---|---|---|---|---|
| Polyoxymethylene resin | A1 |  | phr | 70 | 70 | 70 |
|  | A2 |  | phr | 30 | 30 | 30 |
| Sliding agent | B6 |  | phr | — | — | — |
|  | B7 |  | phr | — | — | — |
|  | B8 |  | phr | — | — | — |
|  | B9 |  | phr | — | — | — |
|  | B10 |  | phr | — | — | — |
|  | B13 |  | phr | — | — | — |
|  | B14 |  | phr | — | — | — |

TABLE 4-continued

|  |  |  | Unit |  |  |  |
|---|---|---|---|---|---|---|
|  |  | B15 | phr | 2 | — | — |
|  |  | B16 | phr | — | 2 | — |
|  |  | B17 | phr | — | — | 2 |
|  |  | Method 1 | [–] | — | — | — |
|  |  | Method 2 | [–] | — | — | — |
|  |  | Method 3 | [–] | ● | ● | ● |
|  |  | Moldability | [–] | AA | AA | AA |
| Surface characteristic | Sliding agent dispersibility | Number of dispersion domain in surface layer 1 (1000 nm × 12000 nm) | (n) | 12 | 12 | 8 |
|  |  | Average minor diameter | (nm) | 120 | 120 | 180 |
|  |  | Average major diameter | (nm) | 1500 | 1200 | 2500 |
|  |  | Number of dispersion domain in surface layer 2 (500 nm × 12000 nm) | (n) | 6 | 5 | 4 |
|  |  | Relative element concentration ratio [C/O] | [–] | 1.48 | 1.15 | 1.35 |
|  |  | Peak intensity ratio (C—O/C=O) | [–] | 425 | 463 | 473 |
| Wear resistance characteristic | High load |  | (μm) | 8 | 14 | 9 |
|  | Very low load | 70° C. | (μm$^2$) | 62 | 23 | 72 |
|  |  | 23° C. | (μm$^2$) | 53 | 15 | 48 |
|  |  | 0° C. | (μm$^2$) | 25 | 22 | 20 |
|  |  | –5° C. | (μm$^2$) | 58 | 24 | 38 |
|  |  | –30° C. | (μm$^2$) | 84 | 28 | 20 |
| Other characteristics | Odor property |  | [–] | A | A | S |
|  | Extrusion production stability |  | [–] | S | S | S |
|  | Surface smoothness |  | [–] | B | A | S |
|  | Color difference before and after aging |  | [–] | C | B | S |
|  | Peeling property |  | [–] | S | A | A |
|  | Outgassing property |  | [–] | 350 | 350 | 350 |
|  | Bleed out test |  | [–] | A | A | S |

|  |  |  | Unit | Example 30 | Example 31 | Example 32 | Example 33 | Example 34 | Example 35 | Example 36 | Example 37 | Example 38 |
|---|---|---|---|---|---|---|---|---|---|---|---|---|
| Polyoxymethylene resin | A1 |  | phr | 70 | 70 | 70 | 70 | 70 | 70 | 70 | 70 | 70 |
|  | A2 |  | phr | 30 | 30 | 30 | 30 | 30 | 30 | 30 | 30 | 30 |
| Sliding agent | B1 |  | phr | 2 | 2 | 2 | 2 | 2 | 2 | 2 | 2 | 2 |
| Coloring agent | C1 |  | phr | 0.5 | 0.7 | 1.5 | 2.5 | 3.5 | — | — | — | — |
|  | C2 |  | phr | — | — | — | — | — | 0.7 | — | — | — |
|  | C3 |  | phr | — | — | — | — | — | — | 0.7 | — | — |
|  | C4 |  | phr | — | — | — | — | — | — | — | 0.7 | — |
|  | C5 |  | phr | — | — | — | — | — | — | — | — | 0.7 |
|  |  | Method 1 | [–] | — | — | — | — | — | — | — | — | — |
|  |  | Method 2 | [–] | — | — | — | — | — | — | — | — | — |
|  |  | Method 3 | [–] | ● | ● | ● | ● | ● | ● | ● | ● | ● |
|  |  | Moldability | [–] | AA | AA | AA | AA | AA | AA | AA | AA | AA |
| Surface characteristic | Sliding agent dispersibility | Number of dispersion domain in surface layer 1 (1000 nm × 12000 nm) | (n) | 13 | 13 | 13 | 13 | 13 | 13 | 13 | 13 | 13 |
|  |  | Average minor diameter | (nm) | 150 | 150 | 150 | 150 | 150 | 150 | 150 | 150 | 150 |
|  |  | Average major diameter | (nm) | 1200 | 1200 | 1200 | 1200 | 1200 | 1200 | 1200 | 1200 | 1200 |
|  |  | Number of dispersion domain in surface layer 2 (500 nm × 12000 nm) | (n) | 6 | 6 | 6 | 6 | 6 | 6 | 6 | 6 | 6 |

-continued

|  |  | Unit | Example 30 | Example 31 | Example 32 | Example 33 | Example 34 | Example 35 | Example 36 | Example 37 | Example 38 |
|---|---|---|---|---|---|---|---|---|---|---|---|
|  | Relative element concentration ratio [C/O] | [—] | 1.85 | 1.70 | 1.56 | 1.34 | 1.24 | 1.75 | 1.73 | 1.75 | 1.78 |
|  | Peak intensity ratio (C—O/C=O) | [—] | 390 | 405 | 394 | 379 | 415 | 436 | 480 | 475 | 423 |
| Wear resistance characteristic | High load | (μm) | 7 | 6 | 7 | 7 | 7 | 6 | 6 | 9 | 12 |
|  | Very low load 70° C. | (μm$^2$) | — | — | — | — | — | — | — | — | — |
|  | 23° C. | (μm$^2$) | 5 | 8 | 13 | 18 | 35 | 7 | 6 | 12 | 37 |
|  | 0° C. | (μm$^2$) | 6 | 5 | 10 | 20 | 45 | 6 | 5 | 12 | 38 |
|  | −5° C. | (μm$^2$) | 9 | 8 | 8 | 13 | 32 | 5 | 4 | 14 | 18 |
|  | −30° C. | (μm$^2$) | 12 | 10 | 11 | 18 | 29 | 5 | 5 | 25 | 29 |
| Other characteristics | Odor property | [—] | A | A | A | B | B | A | A | A | B |
|  | Extrusion production stability | [—] | A | A | A | B | B | A | A | A | B |
|  | Surface smoothness | [—] | S | S | S | S | S | S | S | S | S |
|  | Color difference before and after aging | [—] | S | S | S | S | S | S | S | S | S |
|  | Peeling property | [—] | S | S | S | S | S | S | S | S | S |
|  | Outgassing property | [—] | 360 | 370 | 340 | 320 | 390 | 380 | 380 | 340 | 350 |
|  | Bleed out test | [—] | A | A | A | A | A | A | A | A | A |

TABLE 6

|  |  |  | Unit | Comparable Example 1 | Comparable Example 2 | Comparable Example 3 | Comparable Example 4 | Comparable Example 5 | Comparable Example 6 | Comparable Example 7 | Comparable Example 8 |
|---|---|---|---|---|---|---|---|---|---|---|---|
| Polyoxymethylene resin | A1 |  | phr | 100 | 100 | 100 | 100 | 100 | 100 | 100 | 100 |
|  | A2 |  | phr | — | — | — | — | — | — | — | — |
| Sliding agent | B1 |  | phr | 1 | — | — | — | — | 1 | 1 | — |
|  | B2 |  | phr | — | 1 | — | — | — | — | — | 1 |
|  | B3 |  | phr | — | — | 1 | — | — | — | — | — |
|  | B4 |  | phr | — | — | — | 1 | — | — | — | — |
|  | B5 |  | phr | — | — | — | — | 1 | — | — | — |
|  | B11 |  | phr | — | — | — | — | — | — | — | — |
|  | B12 |  | phr | — | — | — | — | — | — | — | — |
|  | Method 1 |  | [—] | ● | ● | ● | ● | ● | — | — | ● |
|  | Method 2 |  | [—] | — | — | — | — | — | ● | — | — |
|  | Method 3 |  | [—] | — | — | — | — | — | — | ● | — |
|  | Moldability |  | [—] | C | Extrusion failure | Extrusion failure | AA | AA | BB | AA | Extrusion failure |
| Surface characteristic | Sliding agent dispersibility | Number of dispersion domain in surface layer 1 (1000 nm × 12000 nm) | (n) | 3 | 0 | — | 3 | 2 | 6 | 6 | — |
|  |  | Average minor diameter | (nm) | 300 | — | — | 300 | 300 | 200 | 200 | — |
|  |  | Average major diameter | (nm) | 6000 | — | — | 6000 | 6000 | 6000 | 6000 | — |
|  |  | Number of dispersion domain in surface layer 2 (500 nm × 12000 nm) | (n) | 0 | — | — | 0 | 0 | 3 | 4 | — |
|  | Relative element concentration ratio [C/O] |  | [—] | 2.40 | — | — | 1.00 | 1.00 | 2.20 | 1.22 | — |
|  | Peak intensity ratio (C—O/C=O) |  | [—] | 252 | — | — | 361 | 412 | 224 | 235 | — |
| Wear resistance characteristic | High load |  | (μm) | 15 | — | — | 5.1 | 6.3 | 12 | 10 | — |
|  | Very low load | 70° C. | (μm$^2$) | 50 | — | — | — | — | — | — | — |
|  |  | 23° C. | (μm$^2$) | 150 | — | — | 2300 | 1800 | 80 | 34 | — |
|  |  | 0° C. | (μm$^2$) | 50 | — | — | Not evaluated | Not evaluated | 48 | 48 | — |
|  |  | −5° C. | (μm$^2$) | 75 | — | — | Not evaluated | Not evaluated | 65 | 45 | — |
|  |  | −30° C. | (μm$^2$) | 300 | — | — | Not evaluated | Not evaluated | 280 | 270 | — |

TABLE 6-continued

| | | | | | | | | | |
|---|---|---|---|---|---|---|---|---|---|
| Other characteristics | Odor property | [—] | C | — | — | S | C | A | A | — |
| | Extrusion production stability | [—] | C | — | — | S | A | A | S | — |
| | Surface smoothness | [—] | B | — | — | B | B | B | B | — |
| | Color difference before and after aging | [—] | A | — | — | S | C | A | A | — |
| | Peeling property | [—] | B | — | — | S | S | B | B | — |
| | Outgassing property | [—] | 1000 | — | — | 300 | 350 | 500 | 350 | — |
| | Bleed out test | [—] | A | — | — | S | A | S | S | — |

| | | | Unit | Comparable Example 9 | Comparable Example 10 | Comparable Example 11 | Comparable Example 12 | Comparable Example 13 | Comparable Example 14 | Comparable Example 15 |
|---|---|---|---|---|---|---|---|---|---|---|
| | Polyoxymethylene resin | A1 | phr | 100 | 100 | 100 | 50 | 50 | 70 | 70 |
| | | A2 | phr | — | — | — | 50 | 50 | 30 | 30 |
| | Sliding agent | B1 | phr | — | — | — | — | — | — | — |
| | | B2 | phr | 1 | — | — | 2 | — | — | — |
| | | B3 | phr | — | 1 | 1 | — | 2 | — | — |
| | | B4 | phr | — | — | — | — | — | — | — |
| | | B5 | phr | — | — | — | — | — | — | — |
| | | B11 | phr | — | — | — | — | — | 2 | — |
| | | B12 | phr | — | — | — | — | — | — | 2 |
| | Method 1 | | [—] | — | — | — | — | — | — | — |
| | Method 2 | | [—] | — | ● | — | — | — | — | — |
| | Method 3 | | [—] | ● | — | ● | ● | ● | ● | ● |
| | Moldability | | [—] | CC | Extrusion failure | CC | A | C | AA | AA |
| Surface characteristic | Sliding agent dispersibility | Number of dispersion domain in surface layer 1 (1000 nm × 12000 nm) | (n) | 1 | — | Undeterminable | 25 | Undeterminable | 3 | 3 |
| | | Average minor diameter | (nm) | 400 | — | Undeterminable | 100 | Undeterminable | 120 | 100 |
| | | Average major diameter | (nm) | 2500 | — | Undeterminable | 500 | Undeterminable | 1000 | 2000 |
| | | Number of dispersion domain in surface layer 2 (500 nm × 12000 nm) | (n) | 0 | — | Undeterminable | 10 | Undeterminable | 0 | 0 |
| | Relative element concentration ratio [C/O] | | [—] | 2.20 | — | 2.20 | 1.23 | 2.25 | 1.35 | 1.25 |
| | Peak intensity ratio (C—O/C=O) | | [—] | 145 | — | 120 | 50 | 25 | 1587 | 1845 |
| Wear resistance characteristic | High load | | (μm) | 10.5 | — | 8.5 | 5.5 | 45 | 15 | 25 |
| | Very low load | 70° C. | (μm²) | — | — | — | 23 | 85 | 96 | 65 |
| | | 23° C. | (μm²) | 90 | — | 125 | 18 | 85 | 125 | 72 |
| | | 0° C. | (μm²) | 70 | — | 65 | 9 | 36 | 48 | 58 |
| | | −5° C. | (μm²) | 110 | — | 150 | 25 | 150 | 130 | 180 |
| | | −30° C. | (μm²) | 150 | — | 320 | 35 | 130 | 150 | 220 |
| Other characteristics | Odor property | | [—] | B | — | C | A | D | S | S |
| | Extrusion production stability | | [—] | B | — | C | B | A | S | S |
| | Surface smoothness | | [—] | B | — | C | A | D | A | S |
| | Color difference before and after aging | | [—] | S | — | C | S | C | S | S |
| | Peeling property | | [—] | A | — | B | S | A | D | C |
| | Outgassing property | | [—] | 3000 | — | 350 | 3000 | 350 | 1800 | 1500 |
| | Bleed out test | | [—] | C | — | D | S | D | S | S |

The present application is based on Japanese patent application filed on Aug. 25, 2017 (Japanese Patent Application No. 2017-162351), the contents of which are incorporated herein by reference.

INDUSTRIAL APPLICABILITY

The resin molded article of the present invention can be applied to various applications requiring wear resistance under a very low load such as hard disk ramp parts and inner parts of a wristwatch and the like, as well as other applications in which polyoxymethylene have been suitably used so far. Thus, the resin molded article of the present invention has high industrial applicability.

What is claimed is:
1. A polyoxymethylene resin molded article comprising 100 parts by mass of a polyoxymethylene resin (A) and 0.1 to 5 parts by mass of a sliding agent (B), wherein
four or more dispersion domains of the sliding agent (B) are present in a region of 1000 nm in depth from a surface of the molded article and 12000 nm in width, and the dispersion domain has an average minor diameter of 300 nm or less, and an average major diameter of 600 nm or more and 5000 nm or less;

wherein the sliding agent (B) comprises acid modified polyolefin having any of properties (1) to (4):
(1) an acid value of 38 to 80 mg KOH/g,
(2) an acid value of 2 to 25 mg KOH/g and a melt viscosity at 140° C. of 2900 mPa·s or less,
(3) an acid value of 1 to 75 mg KOH/g and a weight average molecular weight of 100 to 2500,
(4) an acid value of 1 to 75 mg KOH/g and a melt viscosity at 180° C. of 100 to 2500 mPa·s.

2. The polyoxymethylene resin molded article according to claim 1, wherein a weight average molecular weight of the sliding agent (B) is 700 or more.

3. The polyoxymethylene resin molded article according to claim 1, wherein in a surface of the molded article, a peak intensity ratio (P/Q) of peak intensity P derived from C—O stretching vibration to peak intensity Q derived from C=O stretching vibration, as measured by infrared spectroscopy, is 200 to 5000.

4. The polyoxymethylene resin molded article according to claim 1, wherein the sliding agent (B) is at least one selected from the group consisting of alcohols, amines, carboxylic acids, esters, amides, and olefin compounds.

5. The polyoxymethylene resin molded article according to claim 1, wherein the sliding agent (B) comprises an olefin compound.

6. The polyoxymethylene resin molded article according to claim 5, wherein the olefin compound is at least one selected from the group consisting of polyethylene, polypropylene, ethylene-propylene copolymer, ethylene-butene copolymer, and ethylene-octene copolymer.

7. The polyoxymethylene resin molded article according to claim 6, wherein the olefin compound is at least one selected from the group consisting of polyethylene, polypropylene and modified compounds thereof.

8. The polyoxymethylene resin molded article according to claim 1, wherein the polyoxymethylene resin (A) comprises a block copolymer.

9. The polyoxymethylene resin molded article according to claim 8, wherein a difference between SP values of a block portion of the block copolymer comprised in the polyoxymethylene resin (A) and of the sliding agent (B) is 5 or less.

10. The polyoxymethylene resin molded article according to claim 8, wherein the block copolymer comprised in the polyoxymethylene resin (A) is an ABA-type block copolymer.

11. The polyoxymethylene resin molded article according to claim 8, wherein the polyoxymethylene resin (A) comprises 5% by mass or more of the block copolymer based on a total of polyoxymethylene resin.

12. The polyoxymethylene resin molded article according to claim 8, wherein the polyoxymethylene resin (A) comprises 20% by mass or more of the block copolymer based on a total of polyoxymethylene resin.

13. The polyoxymethylene resin molded article according to claim 1, further comprising 0.01 to 3 parts by mass of a coloring agent (C) based on 100 parts by mass of the polyoxymethylene resin.

14. The polyoxymethylene resin molded article according to claim 1, wherein a relative element concentration ratio of carbon to oxygen [C/O] (atomic %) in a surface of the molded article is 1.01 to 2.50.

15. A sliding member comprising the polyoxymethylene resin molded article according to claim 1.

16. A ramp for a hard disk comprising the polyoxymethylene resin molded article according to claim 1.

* * * * *